(12) United States Patent
Pham et al.

(10) Patent No.: US 12,345,433 B2
(45) Date of Patent: *Jul. 1, 2025

(54) INDOOR AIR QUALITY SENSOR CALIBRATION SYSTEMS AND METHODS

(71) Applicant: COPELAND LP, Sidney, OH (US)

(72) Inventors: Hung M. Pham, Dayton, OH (US); Stuart K. Morgan, West Chester, OH (US); Brian R. Butler, Centerville, OH (US)

(73) Assignee: Copeland LP, Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,935

(22) Filed: Apr. 18, 2024

(65) Prior Publication Data

US 2024/0310068 A1    Sep. 19, 2024

Related U.S. Application Data

(63) Continuation of application No. 17/048,967, filed as application No. PCT/US2019/028405 on Apr. 19, 2019, now Pat. No. 11,994,313.

(Continued)

(51) Int. Cl.
*F24F 11/64* (2018.01)
*F24F 11/52* (2018.01)
(Continued)

(52) U.S. Cl.
CPC .............. *F24F 11/64* (2018.01); *F24F 11/52* (2018.01); *F24F 2110/10* (2018.01);
(Continued)

(58) Field of Classification Search
None
See application file for complete search history.

(56) References Cited

U.S. PATENT DOCUMENTS

| 4,135,370 A | 1/1979 | Hosoda et al. |
| 4,136,529 A | 1/1979 | McCarty |

(Continued)

FOREIGN PATENT DOCUMENTS

| CN | 102019120 A | 4/2011 |
| CN | 102353751 A | 2/2012 |

(Continued)

OTHER PUBLICATIONS

U.S. Appl. No. 17/048,946, filed Oct. 19, 2020, Stuart K. Morgan.

(Continued)

*Primary Examiner* — Nathan L Laughlin
(74) *Attorney, Agent, or Firm* — Harness, Dickey & Pierce, P.L.C.

(57) ABSTRACT

An IAQ sensor module includes: a sensor configured to measure an amount of an item in air, the item being one of particulate matter, volatile organic compounds, and carbon dioxide; a minimum module configured to selectively store the amount of the item as a minimum value of the amount when a mitigation device has been on for at least a predetermined period, the mitigation device being configured to decrease the amount of the item in the air when on; a storing module configured to selectively store the minimum value as an initial minimum value; an offset module configured to determine a drift offset for the sensor based on a difference between the minimum value and the initial minimum value; and an adjustment module configured to determine an adjusted amount of the item in the air at the IAQ sensor module based on the amount and the drift offset.

20 Claims, 25 Drawing Sheets

Related U.S. Application Data

(60) Provisional application No. 62/660,380, filed on Apr. 20, 2018, provisional application No. 62/660,382, filed on Apr. 20, 2018, provisional application No. 62/660,385, filed on Apr. 20, 2018.

(51) Int. Cl.
  *F24F 110/10* (2018.01)
  *F24F 110/64* (2018.01)
  *F24F 110/66* (2018.01)
  *F24F 110/70* (2018.01)

(52) U.S. Cl.
  CPC ....... *F24F 2110/64* (2018.01); *F24F 2110/66* (2018.01); *F24F 2110/70* (2018.01)

(56) References Cited

U.S. PATENT DOCUMENTS

| | | |
|---|---|---|
| 4,735,054 A | 4/1988 | Beckey |
| 4,873,649 A | 10/1989 | Grald et al. |
| 4,922,808 A | 5/1990 | Smith |
| 4,977,818 A | 12/1990 | Taylor et al. |
| 5,067,394 A | 11/1991 | Cavallero |
| 5,129,234 A | 7/1992 | Alford |
| 5,259,553 A | 11/1993 | Shyu |
| 5,267,897 A | 12/1993 | Drees |
| 5,303,561 A | 4/1994 | Bahel et al. |
| 5,351,855 A | 10/1994 | Nelson et al. |
| 5,394,934 A | 3/1995 | Rein et al. |
| 5,428,964 A | 7/1995 | Lobdell |
| 5,520,328 A | 5/1996 | Bujak, Jr. |
| 5,598,715 A | 2/1997 | Edmisten |
| 5,707,005 A | 1/1998 | Kettler et al. |
| 5,832,411 A | 11/1998 | Schatzmann et al. |
| 5,887,784 A | 3/1999 | Haas |
| 5,892,690 A | 4/1999 | Boatman et al. |
| 5,904,896 A | 5/1999 | High |
| 5,915,473 A | 6/1999 | Ganesh et al. |
| 6,161,764 A | 12/2000 | Jatnieks |
| 6,187,263 B1 | 2/2001 | Nielsen |
| 6,230,980 B1 | 5/2001 | Hudson |
| 6,251,344 B1 | 6/2001 | Goldstein |
| 6,288,646 B1 | 9/2001 | Skardon |
| 6,358,374 B1 | 3/2002 | Obee et al. |
| 6,369,716 B1 | 4/2002 | Abbas et al. |
| 6,377,858 B1 | 4/2002 | Koeppe |
| 6,391,102 B1 | 5/2002 | Bodden et al. |
| 6,392,536 B1 | 5/2002 | Tice et al. |
| 6,394,427 B1 | 5/2002 | Guetersloh et al. |
| 6,406,367 B1 | 6/2002 | Chou et al. |
| 6,406,506 B1 | 6/2002 | Moredock et al. |
| 6,423,118 B1 | 7/2002 | Becerra et al. |
| 6,448,896 B1 | 9/2002 | Bankus et al. |
| 6,466,133 B1 | 10/2002 | Skardon |
| 6,493,638 B1 | 12/2002 | McLean et al. |
| 6,494,053 B1 | 12/2002 | Forkosh et al. |
| 6,494,940 B1 | 12/2002 | Hak |
| 6,503,462 B1 | 1/2003 | Michalakos et al. |
| 6,557,365 B2 | 5/2003 | Dinnage et al. |
| 6,578,770 B1 | 6/2003 | Rosen |
| 6,582,295 B1 | 6/2003 | Abouchaar |
| 6,588,250 B2 | 7/2003 | Schell |
| 6,622,993 B2 | 9/2003 | Mulvaney |
| 6,691,526 B2 | 2/2004 | Gether et al. |
| 6,698,219 B2 | 3/2004 | Sekhar et al. |
| 6,711,470 B1 | 3/2004 | Hartenstein et al. |
| 6,752,713 B2 | 6/2004 | Johnson, Jr. |
| 6,790,136 B2 | 9/2004 | Sharp et al. |
| 6,826,920 B2 | 12/2004 | Wacker |
| 6,843,068 B1 | 1/2005 | Wacker |
| 6,848,266 B1 | 2/2005 | Sheehan |
| 6,884,399 B2 | 4/2005 | Reisfeld et al. |
| 6,898,960 B1 | 5/2005 | Bodnar |
| 6,902,592 B2 | 6/2005 | Green et al. |
| 6,916,239 B2 | 7/2005 | Siddaramanna et al. |
| 6,919,809 B2 | 7/2005 | Blunn et al. |
| 6,920,874 B1 | 7/2005 | Siegel |
| 6,924,326 B2 | 8/2005 | Meyer et al. |
| 6,926,079 B2 | 8/2005 | Kensok et al. |
| 6,941,193 B2 | 9/2005 | Frecska et al. |
| 6,952,715 B1 | 10/2005 | Kronz |
| 7,016,791 B2 | 3/2006 | Carnegie et al. |
| 7,048,776 B2 | 5/2006 | Moore et al. |
| 7,059,400 B2 | 6/2006 | Sekhar et al. |
| 7,114,343 B2 | 10/2006 | Kates |
| 7,151,264 B2 | 12/2006 | Ehlers, Sr. |
| 7,178,350 B2 | 2/2007 | Shah |
| 7,186,290 B2 | 3/2007 | Sheehan et al. |
| 7,222,494 B2 | 5/2007 | Peterson et al. |
| 7,241,326 B2 | 7/2007 | Han et al. |
| 7,253,743 B2 | 8/2007 | Liang et al. |
| 7,255,831 B2 | 8/2007 | Wei et al. |
| 7,261,762 B2 | 8/2007 | Kang et al. |
| 7,266,960 B2 | 9/2007 | Shah |
| 7,267,017 B1 | 9/2007 | Bodnar |
| RE39,871 E | 10/2007 | Skardon |
| 7,291,206 B1 | 11/2007 | Kiern et al. |
| 7,291,315 B2 | 11/2007 | Obee et al. |
| 7,302,313 B2 | 11/2007 | Sharp et al. |
| 7,306,650 B2 | 12/2007 | Slayzak et al. |
| 7,325,748 B2 | 2/2008 | Acker, Jr. |
| 7,326,388 B2 | 2/2008 | Uslenghi et al. |
| 7,357,828 B2 | 4/2008 | Bohlen |
| 7,366,588 B2 | 4/2008 | Kim et al. |
| 7,368,003 B2 | 5/2008 | Crapser et al. |
| 7,369,955 B2 | 5/2008 | Lee |
| 7,378,064 B2 | 5/2008 | Uslenghi et al. |
| 7,381,244 B2 | 6/2008 | Tyndall et al. |
| 7,389,158 B2 | 6/2008 | Desrochers et al. |
| 7,398,821 B2 | 7/2008 | Rainer et al. |
| 7,407,624 B2 | 8/2008 | Cumberland et al. |
| 7,413,594 B2 | 8/2008 | Paterson et al. |
| 7,434,413 B2 | 10/2008 | Wruck |
| 7,475,828 B2 | 1/2009 | Bartlett et al. |
| 7,552,030 B2 | 6/2009 | Guralnik et al. |
| 7,552,635 B2 | 6/2009 | Chang et al. |
| 7,574,871 B2 | 8/2009 | Bloemer et al. |
| 7,621,985 B1 | 11/2009 | Kuo |
| 7,632,178 B2 | 12/2009 | Meneely, Jr. |
| 7,632,340 B2 | 12/2009 | Brady et al. |
| 7,635,845 B2 | 12/2009 | Jensen et al. |
| 7,645,323 B2 | 1/2010 | Massenbauer-Strafe et al. |
| 7,651,256 B2 | 1/2010 | Lee et al. |
| 7,721,560 B2 | 5/2010 | Carpenter |
| 7,740,184 B2 | 6/2010 | Schnell et al. |
| 7,748,639 B2 | 7/2010 | Perry |
| 7,758,408 B2 | 7/2010 | Hagentoft |
| 7,765,792 B2 | 8/2010 | Rhodes et al. |
| 7,780,092 B2 | 8/2010 | Ahmed |
| 7,789,951 B2 | 9/2010 | Sung et al. |
| 7,809,472 B1 | 10/2010 | Silva et al. |
| 7,811,363 B2 | 10/2010 | Zhang |
| 7,836,712 B2 | 11/2010 | Sasao et al. |
| 7,837,958 B2 | 11/2010 | Crapser et al. |
| 7,839,275 B2 | 11/2010 | Spalink et al. |
| 7,857,884 B2 | 12/2010 | Bohlen |
| 7,857,890 B2 | 12/2010 | Paterson et al. |
| 7,918,407 B2 | 4/2011 | Patch |
| 7,932,490 B2 | 4/2011 | Wang et al. |
| 7,938,896 B2 | 5/2011 | Paterson et al. |
| 7,951,327 B2 | 5/2011 | Reisfeld et al. |
| 7,966,104 B2 | 6/2011 | Srivastava et al. |
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |

(56) References Cited

U.S. PATENT DOCUMENTS

| | | |
|---|---|---|
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Kilps et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,233,472 B2 | 1/2016 | Angle et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,375,847 B2 | 6/2016 | Angle et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,406,212 B2 | 8/2016 | De Luca et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |
| 9,423,144 B2 | 8/2016 | Evans et al. |
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |

(56) References Cited

U.S. PATENT DOCUMENTS

| | | |
|---|---|---|
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,798,309 B2 | 10/2017 | Tirpak |
| 9,802,322 B2 | 10/2017 | Angle et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,874,873 B2 | 1/2018 | Angle et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 10,139,384 B1 | 11/2018 | Nourbakhsh |
| 10,222,360 B1 | 3/2019 | Nourbakhsh et al. |
| 10,650,621 B1 | 5/2020 | King et al. |
| 10,712,036 B2 | 7/2020 | Mowris et al. |
| 11,232,655 B2 | 1/2022 | Bhattacharyya et al. |
| 2003/0070544 A1 | 4/2003 | Mulvaney et al. |
| 2005/0076655 A1 | 4/2005 | Wong |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2007/0243808 A1 | 10/2007 | Mathur et al. |
| 2008/0014857 A1 | 1/2008 | Spadafora et al. |
| 2008/0022705 A1 | 1/2008 | Clearman |
| 2008/0078842 A1 | 4/2008 | MacDonald |
| 2008/0182506 A1 | 7/2008 | Jackson et al. |
| 2008/0315000 A1 | 12/2008 | Gorthala et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2010/0241287 A1 | 9/2010 | Nishino et al. |
| 2011/0010071 A1 | 1/2011 | Rhodes et al. |
| 2011/0093229 A1 | 4/2011 | Ekvall et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0150333 A1 | 6/2012 | De Luca et al. |
| 2012/0323374 A1 | 12/2012 | Dean-Hendricks et al. |
| 2013/0014522 A1 | 1/2013 | Lukasse et al. |
| 2013/0085613 A1 | 4/2013 | Bester et al. |
| 2013/0144527 A1 | 6/2013 | Kuhnreichi |
| 2013/0174646 A1 | 7/2013 | Martin |
| 2013/0174841 A1 | 7/2013 | McAuley et al. |
| 2013/0184875 A1 | 7/2013 | Miura |
| 2013/0226352 A1 | 8/2013 | Dean-Hendricks et al. |
| 2013/0260668 A1 | 10/2013 | Stakutis et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2014/0371917 A1 | 12/2014 | Rite |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0194039 A1 | 7/2015 | Martin |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0323941 A1 | 11/2015 | Pariseau et al. |
| 2015/0330650 A1 | 11/2015 | Abiprojo et al. |
| 2015/0330817 A1 | 11/2015 | Law et al. |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |

(56) References Cited

U.S. PATENT DOCUMENTS

| | | |
|---|---|---|
| 2016/0048143 A1 | 2/2016 | Chan et al. |
| 2016/0054018 A1 | 2/2016 | Motodani et al. |
| 2016/0054023 A1 | 2/2016 | Baker et al. |
| 2016/0061472 A1 | 3/2016 | Lee et al. |
| 2016/0061476 A1 | 3/2016 | Schultz et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0166974 A1 | 6/2016 | Marra |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256097 A1 | 9/2016 | Manautou et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0267776 A1 | 9/2016 | Martin |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0370795 A1 | 12/2016 | Musselman et al. |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0103633 A1 | 4/2017 | Khire et al. |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0195754 A1 | 7/2017 | Grambichler et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 | 12/2017 | Zhang et al. |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0073759 A1 | 3/2018 | Zhang et al. |
| 2018/0119973 A1 | 5/2018 | Rothman et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2018/0223855 A1* | 8/2018 | Wu ............... B01D 46/444 |
| 2018/0304472 A1 | 10/2018 | Angle et al. |
| 2018/0350226 A1 | 12/2018 | Martin |
| 2019/0017721 A1 | 1/2019 | Motodani et al. |
| 2019/0097827 A1 | 3/2019 | Angle et al. |
| 2019/0178522 A1 | 6/2019 | Sun et al. |
| 2019/0209806 A1 | 7/2019 | Allen et al. |
| 2019/0242592 A1 | 8/2019 | Adamek et al. |
| 2019/0277528 A1 | 9/2019 | Malhotra et al. |
| 2019/0277822 A1* | 9/2019 | Chadha ............ G01N 33/0031 |
| 2019/0285295 A1 | 9/2019 | Tripathii |
| 2019/0353378 A1 | 11/2019 | Ramamurti et al. |
| 2019/0353379 A1 | 11/2019 | Lee et al. |
| 2019/0361412 A1 | 11/2019 | Park et al. |
| 2020/0182503 A1 | 6/2020 | Kelly et al. |
| 2020/0273268 A1 | 8/2020 | Bhattacharyya et al. |
| 2021/0045640 A1 | 2/2021 | Poltorak |
| 2021/0048206 A1 | 2/2021 | Forzani et al. |
| 2021/0131681 A1 | 5/2021 | Duncan |
| 2021/0156582 A1 | 5/2021 | Stevenson et al. |
| 2021/0158975 A1 | 5/2021 | Turney et al. |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 2007083106 A | 4/2007 |
| JP | 2007120815 A | 5/2007 |
| JP | 2011146137 A | 7/2011 |
| JP | 5231476 B2 | 7/2013 |
| JP | 2014208343 A | 11/2014 |
| JP | 2015114014 A | 6/2015 |
| JP | 2015152175 A | 8/2015 |

(56) References Cited

FOREIGN PATENT DOCUMENTS

| | | | |
|---|---|---|---|
| JP | 2018017403 A | 2/2018 | |
| KR | 100182648 | 5/1999 | |
| KR | 20000007498 A | 2/2000 | |
| KR | 100355352 B1 | 9/2002 | |
| KR | 20030016787 A | 3/2003 | |
| KR | 100509332 B1 | 8/2005 | |
| KR | 100556066 B1 | 3/2006 | |
| KR | 100721458 B1 | 5/2007 | |
| KR | 20070072787 A | 7/2007 | |
| KR | 100782175 B1 | 12/2007 | |
| KR | 100819077 B1 | 4/2008 | |
| KR | 100930346 B1 | 12/2009 | |
| KR | 20100089605 A | 8/2010 | |
| KR | 101013372 B1 | 2/2011 | |
| KR | 20110074222 A | 6/2011 | |
| KR | 20110093329 A | 8/2011 | |
| KR | 10-1492316 B1 | 2/2015 | |
| KR | 101566592 B1 | 11/2015 | |
| KR | 101765454 B1 | 8/2017 | |
| KR | 101771053 B1 | 8/2017 | |
| KR | 20170122043 A | 11/2017 | |
| KR | 20180007381 A | 1/2018 | |
| LU | 92350 A1 | 7/2015 | |
| WO | WO-9409324 A1 | 4/1994 | |
| WO | WO-2005110580 A2 | 11/2005 | |
| WO | WO-2012177072 A2 | 12/2012 | |
| WO | WO-2013163612 A1 | 10/2013 | |
| WO | WO-2015078672 A1 | 6/2015 | |
| WO | WO-2016102337 A1 | 6/2016 | |
| WO | WO-2016139544 A1 | 9/2016 | |
| WO | WO-2017146637 A1 | 8/2017 | |
| WO | WO-2017157987 A1 | 9/2017 | |

OTHER PUBLICATIONS

U.S. Appl. No. 17/048,967, filed Oct. 19, 2020, Hung M. Pham.
"Clean Your Air with Keen Home Smart Filters", Keen Home, Inc., <https://keenhome.io/pages/smart-filter> 2018.
"Home Comfort: Digital, App-Based Climate Control", Ecovent Systems Inc., <https://www.ecoventsystems.com/> 2018.
"Meet the Keen Home Zoning System—How It Works", Keen Home, Inc., <https://keenhome.io/pages/how-it-works> 2018.
Applicant-Initiated Interview Summary regarding U.S. Appl. No. 17/048,982 dated Apr. 15, 2022.
Applicant-Initiated Interview Summary regarding U.S. Appl. No. 17/048,982 dated Jun. 9, 2022.
Applicant-Initiated Interview Summary regarding U.S. Appl. No. 17/078,019 dated Apr. 27, 2022.
Doty, Steve, et al., "Building Operations: Balancing Energy Efficiency with Indoor Air Quality", 2009.
El Mankibi, Mohamed, "Indoor Air Quality Control in Case of Scheduled or Intermittent Occupancy Based Building: Development of a Scale Model", 2009.
Emmerich, Steven, et al., "Indoor Air Quality Impacts of Residential HVAC Systems, Phase 1 Report: Computer Simulation Plan", NISTIR 5346: Building and Fire Research Laboratory; National Institute of Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.
Extended European Search Report regarding Application No. 19787690.7 dated Dec. 10, 2021.
Extended European Search Report regarding U.S. Appl. No. 19/789,429 dated Dec. 17, 2021.
Final Office Action regarding U.S. Appl. No. 17/048,946 dated Oct. 13, 2023.
Final Office Action regarding U.S. Appl. No. 17/048,967 dated Nov. 20, 2023.
Final Office Action regarding U.S. Appl. No. 17/048,967 dated September Nov. 20, 2023.
Footbot; Product Specifications; www.footbot.io. Accessed Sep. 13, 2017.
Herberger, Simone, et al., "Indoor Air Quality Monitoring Improving Air Quality Perception," 2012.
International Search Report of the ISA/KR regarding International Application No. PCT/US2018/062190 dated Mar. 21, 2019.
International Search Report of the ISA/KR regarding International Application No. PCT/US2019/028402 dated Aug. 7, 2019.
International Search Report of the ISA/KR regarding International Application No. PCT/US2019/028408 dated Aug. 9, 2019.
International Search Report of the ISA/KR regarding International Application No. PCT/US2019/028410 dated Aug. 7, 2019.
International Search Report regarding International Application No. PCT/US2019/028391 dated Aug. 14, 2019.
Non-Final Office Action regarding U.S. Appl. No. 17/048,798 dated Sep. 14, 2021.
Non-Final Office Action regarding U.S. Appl. No. 17/048,982 dated Feb. 1, 2022.
Non-Final Office Action regarding U.S. Appl. No. 17/078,019 dated Feb. 15, 2022.
Notice of Allowance regarding U.S. Appl. No. 16/196,703 dated May 14, 2020.
Notice of Allowance regarding U.S. Appl. No. 16/196,744 dated Apr. 27, 2020.
Notice of Allowance regarding U.S. Appl. No. 16/196,744 dated Mar. 4, 2020.
Notice of Allowance regarding U.S. Appl. No. 16/196,770 dated Mar. 3, 2020.
Notice of Allowance regarding U.S. Appl. No. 16/196,770 dated May 5, 2020.
Notice of Allowance regarding U.S. Appl. No. 17/048,798 dated Oct. 19, 2021.
Notice of Allowance regarding U.S. Appl. No. 17/048,887 dated Apr. 14, 2022.
Notice of Allowance regarding U.S. Appl. No. 17/048,982 dated Jul. 18, 2022.
Notice of Allowance regarding U.S. Appl. No. 17/078,019 dated Jun. 23, 2022.
Shaw, C. Y., "Maintaining Acceptable Air Quality in Office Buildings Through Ventilation," Construction Technology Updated No. 3, Institute for Research in Construction, National Research Council of Canada, Jan. 1997; 4 Pages.
Turner, William J.N., et al, "Energy and IAQ Implications of Residential Ventilation Cooling," ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Written Opinion of the ISA/KR regarding International Application No. PCT/US2018/062190 dated Mar. 21, 2019.
Written Opinion of the ISA/KR regarding International Application No. PCT/US2019/028391 dated Aug. 14, 2019.
Written Opinion of the ISA/KR regarding International Application No. PCT/US2019/028402 dated Aug. 7, 2019.
Written Opinion of the ISA/KR regarding International Application No. PCT/US2019/028408 dated Aug. 9, 2019.
Written Opinion of the ISA/KR regarding International Application No. PCT/US2019/028410 dated Aug. 7, 2019.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.

* cited by examiner

FIG. 8

INDOOR AIR QUALITY SENSOR CALIBRATION SYSTEMS AND METHODS

CROSS-REFERENCE TO RELATED APPLICATIONS

This application is a continuation of U.S. application Ser. No. 17/048,967 filed on Oct. 19, 2020, which is the U.S. National Phase Application under 35 U.S.C. 371 of International Application No. PCT/US2019/028405 filed on Apr. 19, 2019, which claims the benefit of U.S. Provisional Application No. 62/660,380, filed on Apr. 20, 2018, U.S. Provisional Application No. 62/660,382, filed on Apr. 20, 2018, and U.S. Provisional Application No. 62/660,385, filed on Apr. 20, 2018. The entire disclosures of the applications referenced above are incorporated herein by reference.

FIELD

The present disclosure relates to environmental control systems and more particularly to systems and methods for calibrating indoor air quality sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and/or air conditioning) system controls temperature and humidity of a building. Upper and lower temperature limits may be specified by an occupant or owner of the building, such as an employee working in the building or a homeowner.

A thermostat controls operation of the HVAC system based on a comparison of the temperature at a thermostat and the target values. The thermostat may control the HVAC system to heat the building when the temperature is less than the lower temperature limit. The thermostat may control the HVAC system to cool the building when the temperature is greater than the upper temperature limit. Heating the building and cooling the building generally decreases humidity, although the HVAC system may include a humidifier that adds humidity to warm air output by the HVAC system during heating of the building.

SUMMARY

In a feature an indoor air quality (IAQ) system for a building includes a first IAQ sensor module including a first sensor configured to measure a first amount of an item in air at the first IAQ sensor module, where the item is one of particulate matter, volatile organic compounds (VOC), and carbon dioxide; a second IAQ sensor module that is different than the first IAQ sensor module and that includes a second sensor configured to measure a second amount of the item in air at the second IAQ sensor module; an average module configured to selectively determine an average of the first amount and the second amount; an offset module configured to: determine a first offset for the first sensor based on a first difference between the average and the first amount; determine a second offset for the second sensor based on a second difference between the average and the second amount; and an adjustment module configured to: determine a first adjusted amount of the item in the air at the first IAQ sensor module based on the first amount and the first offset; and determine a second adjusted amount of the item in the air at the second IAQ sensor module based on the second amount and the second offset.

In further features, the adjustment module is configured to: set the first adjusted amount of the item in the air at the first IAQ sensor module based on the first amount plus the first offset; and set the second adjusted amount of the item in the air at the second IAQ sensor module based on the second amount plus the second offset.

In further features: the average module is configured to determine the average in response to receipt of an indication that the first and second IAQ sensor modules are located within a predetermined distance of each other and within the same room of the building; and the offset module is configured to determine the first and second offsets in response to the receipt of the indication that the first and second IAQ sensor modules are located within the predetermined distance of each other and within the same room of the building.

In further features, a user device is configured to, in response to user input to the user device, wirelessly transmit the indication that the first and second IAQ sensor modules are located within the predetermined distance of each other and within the same room of the building.

In further features: the first IAQ sensor module further includes a third sensor configured to measure a third amount of a second item in air at the first IAQ sensor module, where the second item is one of particulate matter, VOC, and carbon dioxide that is different than the item; the second IAQ sensor module further includes a fourth sensor configured to measure a fourth amount of the second item in air at the second IAQ sensor module; the average module is further configured to selectively determine a second average of the third amount and the fourth amount; the offset module is further configured to: determine a third offset for third sensor based on a third difference between the second average and the third amount; and determine a fourth offset for the fourth sensor based on a fourth difference between the second average and the fourth amount; and the adjustment module is further configured to: determine a third adjusted amount of the second item in the air at the first IAQ sensor module based on the third amount and the third offset; and determine a fourth adjusted amount of the second item in the air at the second IAQ sensor module based on the fourth amount and the fourth offset.

In further features: the first IAQ sensor module further includes: a third sensor configured to measure a third amount of a second item in air at the first IAQ sensor module, where the second item is one of particulate matter, VOC, and CO2 that is different than the item; a fourth sensor configured to measure a fourth amount of a third item in air at the first IAQ sensor module, where the third item is one of particulate matter, VOC, and carbon dioxide that is different than the item and the second item; the second IAQ sensor module further includes: a fifth sensor configured to measure a fifth amount of the second item in air at the second IAQ sensor module; a sixth sensor configured to measure a sixth amount of the third item in air at the second IAQ sensor module; the average module is further configured to: selectively determine a second average of the third amount and the fifth amount; and selectively determine a third average of the fourth amount and the sixth amount; the offset module is further configured to: determine a third offset for the third sensor based on a third difference between the second average and the third amount; determine a fourth offset for the fourth sensor based on a fourth difference between the third average and the fourth amount; determine a fifth offset for the fifth sensor based on a fifth difference between the second average and the fifth amount; and determine a sixth offset for the sixth sensor based on a sixth difference between the third average and the sixth amount; and the adjustment module is further configured to: determine a third adjusted amount of the second item in the air at the first IAQ sensor module based on the third amount and the third offset; determine a fourth adjusted amount of the third item in the air at the first IAQ sensor module based on the fourth amount and the fourth offset; determine a fifth adjusted amount of the second item in the air at the second IAQ sensor module based on the fifth amount and the fifth offset; and determine a sixth adjusted amount of the third item in the air at the second IAQ sensor module based on the sixth amount and the sixth offset.

In further features, the IAQ system further includes: an alert module configured to generate an alert signal when the first amount of the item in air is outside of a predetermined range; and a user device including a display, the user device being configured to display a predetermined user interface on the display in response to receipt of the alert signal.

In further features, the IAQ system further includes: an alert module configured to generate an alert signal when the first offset is greater than a predetermined value; and a user device including a display, the user device being configured to display a predetermined user interface on the display in response to receipt of the alert signal.

In further features, the IAQ system further includes: a minimum module configured to selectively store a minimum value of the first amount when a mitigation device has been on for at least a predetermined period, where the mitigation device is configured to decrease the first amount of the item in the air when the mitigation device is on; a storing module configured to selectively store the minimum value as an initial minimum value; an offset module configured to determine a drift offset for the first sensor based on a difference between the minimum value and the initial minimum value; and an adjustment module configured to determine an adjusted amount of the item in the air at the first IAQ sensor module based on the first amount and the drift offset.

In further features, the IAQ system further includes: a third IAQ sensor module that is different than the first and second IAQ sensor modules and that includes a third sensor configured to measure a third amount of the item in air at the third IAQ sensor module; where: the average module is configured to selectively determine the average based on the first, second, and third amounts; the offset module is further configured to determine a third offset for the third sensor based on a third difference between the average and the third amount; and the adjustment module is further configured to determine a third adjusted amount of the item in the air at the third IAQ sensor module based on the third amount and the third offset.

In further features, the IAQ system further includes the average module is configured to determine the average based on the first and second amounts and without the third amount when the third amount is outside of a predetermined range.

In a feature, an indoor air quality (IAQ) method includes: by a first sensor of a first IAQ sensor module, measuring a first amount of an item in air at the first IAQ sensor module, where the item is one of particulate matter, volatile organic compounds (VOC), and carbon dioxide; by a second sensor of a second IAQ sensor module that is different than the first IAQ sensor module, measuring a second amount of the item in air at the second IAQ sensor module; selectively determining an average of the first amount and the second amount; determining a first offset for the first sensor based on a first difference between the average and the first amount; determining a second offset for the second sensor based on a second difference between the average and the second amount; determining a first adjusted amount of the item in the air at the first IAQ sensor module based on the first amount and the first offset; and determining a second adjusted amount of the item in the air at the second IAQ sensor module based on the second amount and the second offset.

In further features: determining the first adjusted amount includes setting the first adjusted amount of the item in the air at the first IAQ sensor module based on the first amount plus the first offset; and determining the second adjusted amount includes setting the second adjusted amount of the item in the air at the second IAQ sensor module based on the second amount plus the second offset.

In further features: selectively determining an average includes determining the average in response to receipt of an indication that the first and second IAQ sensor modules are located within a predetermined distance of each other and within the same room of the building; and determining the first and second offsets includes determining the first and second offsets in response to the receipt of the indication that the first and second IAQ sensor modules are located within the predetermined distance of each other and within the same room of the building.

In further features the IAQ method further includes, by a user device, in response to user input to the user device, wirelessly transmitting the indication that the first and second IAQ sensor modules are located within the predetermined distance of each other and within the same room of the building.

In further features the IAQ method further includes: by a third sensor of the first IAQ sensor module, measuring a third amount of a second item in air at the first IAQ sensor module, wherein the second item is one of particulate matter, VOC, and carbon dioxide that is different than the item; by a fourth sensor of the second IAQ sensor module, measuring a fourth amount of the second item in air at the second IAQ sensor module; selectively determining a second average of the third amount and the fourth amount; determining a third offset for third sensor based on a third difference between the second average and the third amount; determining a fourth offset for the fourth sensor based on a fourth difference between the second average and the fourth amount; determining a third adjusted amount of the second item in the air at the first IAQ sensor module based on the third amount and the third offset; and determining a fourth adjusted amount of the second item in the air at the second IAQ sensor module based on the fourth amount and the fourth offset.

In further features the IAQ method further includes: by a third sensor of the first IAQ sensor module, measuring a third amount of a second item in air at the first IAQ sensor module, where the second item is one of particulate matter, VOC, and carbon dioxide that is different than the item; by a fourth sensor of the first IAQ sensor module, measuring a fourth amount of a third item in air at the first IAQ sensor module, where the third item is one of particulate matter, VOC, and carbon dioxide that is different than the item and the second item; by a fifth sensor of the second IAQ sensor module, measuring a fifth amount of the second item in air at the second IAQ sensor module; by a sixth sensor of the second IAQ sensor module, measuring a sixth amount of the third item in air at the second IAQ sensor module; selectively determining a second average of the third amount and the fifth amount; selectively determining a third average of the fourth amount and the sixth amount; determining a third offset for the third sensor based on a third difference between the second average and the third amount; determining a fourth offset for the fourth sensor based on a fourth difference between the third average and the fourth amount; determining a fifth offset for the fifth sensor based on a fifth difference between the second average and the fifth amount; determining a sixth offset for the sixth sensor based on a sixth difference between the third average and the sixth amount; determining a third adjusted amount of the second item in the air at the first IAQ sensor module based on the third amount and the third offset; determining a fourth adjusted amount of the third item in the air at the first IAQ sensor module based on the fourth amount and the fourth offset; determining a fifth adjusted amount of the second item in the air at the second IAQ sensor module based on the fifth amount and the fifth offset; and determining a sixth adjusted amount of the third item in the air at the second IAQ sensor module based on the sixth amount and the sixth offset.

In further features the IAQ method further includes: generating an alert signal when the first amount of the item in air is outside of a predetermined range; and by a user device including a display, displaying a predetermined user interface on the display in response to receipt of the alert signal.

In further features the IAQ method further includes: generating an alert signal when the first offset is greater than a predetermined value; and by a user device including a display, the displaying a predetermined user interface on the display in response to receipt of the alert signal.

In further features the IAQ method further includes: selectively storing a minimum value of the first amount when a mitigation device has been on for at least a predetermined period, where the mitigation device is configured to decrease the first amount of the item in the air when the mitigation device is on; selectively storing the minimum value as an initial minimum value; determining a drift offset for the first sensor based on a difference between the minimum value and the initial minimum value; and determining an adjusted amount of the item in the air at the first IAQ sensor module based on the first amount and the drift offset.

In further features the IAQ method further includes: by a third sensor of a third IAQ sensor module that is different than the first and second IAQ sensor modules, measuring a third amount of the item in air at the third IAQ sensor module, where selectively determining the average includes selectively determining the average based on the first, second, and third amounts; determining a third offset for the third sensor based on a third difference between the average and the third amount; and determining a third adjusted amount of the item in the air at the third IAQ sensor module based on the third amount and the third offset.

In further features, selectively determining the average includes determining the average based on the first and second amounts and without the third amount when the third amount is outside of a predetermined range.

In a feature, an indoor air quality (IAQ) sensor module includes: a volatile organic compound (VOC) sensor that includes a sensing element, the sensing element being configured to vary its resistance based on an amount of VOCs in air measured by the sensing element; a reference module configured to, in response to an indication that the IAQ sensor module is located in outdoor ambient air, store the resistance of the sensing element as a reference resistance, where the reference resistance corresponds to a predetermined minimum amount of VOCs; and a VOC module configured to determine a measured amount of VOCs in the air at the VOC sensor based on the resistance of the sensing element, the reference resistance, and the predetermined minimum amount of VOCs.

In further features, the VOC module is configured to increase the measured amount of VOCs above the predetermined minimum amount of VOCs as a difference between the resistance and the reference resistance increases.

In further features, the VOC module is configured to decrease the measured amount of VOCs toward the predetermined minimum amount of VOCs as the difference between the resistance and the reference resistance decreases.

In further features, the IAQ sensor module further includes: a temperature sensor that measures a temperature of air at the IAQ sensor module; and an outdoors module configured to generate the indication that the IAQ sensor module is located in outdoor ambient air when the temperature of the air at the IAQ sensor module is within a predetermined range of an outdoor ambient air temperature determined based on a geographical location of a building associated with the IAQ sensor module.

In further features, the IAQ sensor module an outdoors module configured to generate the indication that the IAQ sensor module is located in outdoor ambient air in response to user input from a user device indicative of user input that the IAQ sensor module is located in outdoor ambient air.

In further features, the IAQ sensor module further includes: a transceiver configured to wirelessly transmit, via at least one antenna, the measured amount of VOCs; and a user device including a display, the user device being configured to display the measured amount of VOCs on the display.

In further features, the predetermined minimum amount of VOCs is 175 parts per billion.

In further features, the IAQ sensor module further includes a carbon dioxide sensor that includes a second sensing element, the sensing element being configured to vary a second resistance of the second sensing element based on an amount of carbon dioxide in the air measured by the second sensing element, the carbon dioxide sensor being configured to: in response to the indication that the IAQ sensor module is located in outdoor ambient air, store the second resistance of the second sensing element as a second reference resistance, where the second reference resistance corresponds to a predetermined minimum amount of carbon dioxide; and determine a measured amount of carbon dioxide in the air based on the second resistance of the second sensing element, the second reference resistance, and the predetermined minimum amount of carbon dioxide.

In further features, the IAQ sensor module further includes at least one of: a temperature sensor configured to measure a temperature of air at the IAQ sensor module; a relative humidity (RH) sensor configured to measure a RH of the air at the IAQ sensor module; a particulate sensor configured to measure an amount of particulate of at least a predetermined size present in the air at the IAQ sensor module; and a carbon dioxide sensor configured to measure an amount of carbon dioxide present in the air at the IAQ sensor module.

In further features, the IAQ sensor module further includes: a mitigation module configured to, based on the measured amount of VOCs, selectively operate at least one of: an air handler unit of a heating, ventilation, and air conditioning (HVAC) system; an air purifier configured to receive power via a standard wall outlet and to filter particulate from air within a building; and a ventilator configured to vent air out of the building from within the building.

In further features, the IAQ sensor module further includes a battery configured to power the IAQ sensor module.

In a feature, a method includes: by a sensing element of a volatile organic compound (VOC) sensor of an indoor air quality sensor module, varying a resistance of the sensing element based on an amount of VOCs in air; in response to an indication that the IAQ sensor module is located in outdoor ambient air, storing a resistance of the sensing element as a reference resistance, where the reference resistance corresponds to a predetermined minimum amount of VOCs; and determining a measured amount of VOCs in the air at the VOC sensor based on the resistance of the sensing element, the reference resistance, and the predetermined minimum amount of VOCs.

In further features, determining a measured amount of VOCs in the air includes increasing the measured amount of VOCs above the predetermined minimum amount of VOCs as a difference between the resistance and the reference resistance increases.

In further features, determining a measured amount of VOCs in the air includes decreasing the measured amount of VOCs toward the predetermined minimum amount of VOCs as the difference between the resistance and the reference resistance decreases.

In further features, the method further includes: by a temperature sensor of the IAQ sensor module, measuring a temperature of air at the IAQ sensor module; and generating the indication that the IAQ sensor module is located in outdoor ambient air when the temperature of the air at the IAQ sensor module is within a predetermined range of an outdoor ambient air temperature determined based on a geographical location of a building associated with the IAQ sensor module.

In further features, the method further includes generating the indication that the IAQ sensor module is located in outdoor ambient air in response to user input from a user device indicative of user input that the IAQ sensor module is located in outdoor ambient air.

In further features, the method further includes: by a transceiver via at least one antenna, wirelessly transmitting the measured amount of VOCs; and by a user device including a display, displaying the measured amount of VOCs on the display.

In further features, the predetermined minimum amount of VOCs is 175 parts per billion.

In further features, the method further includes: by a second sensing element of a carbon dioxide sensor of the IAQ sensor module, varying a second resistance of the second sensing element based on an amount of carbon dioxide in the air; in response to the indication that the IAQ sensor module is located in outdoor ambient air, storing the second resistance of the second sensing element as a second reference resistance, where the second reference resistance corresponds to a predetermined minimum amount of carbon dioxide; and determining a measured amount of carbon dioxide in the air based on the second resistance of the second sensing element, the second reference resistance, and the predetermined minimum amount of carbon dioxide.

In further features, the method further includes at least one of: by a temperature sensor of the IAQ sensor module, measuring a temperature of air at the IAQ sensor module; by a relative humidity (RH) sensor of the IAQ sensor module, measuring a RH of the air at the IAQ sensor module; by a particulate sensor of the IAQ sensor module, measuring an amount of particulate of at least a predetermined size present in the air at the IAQ sensor module; and by a carbon dioxide sensor of the IAQ sensor module, measuring an amount of carbon dioxide present in the air at the IAQ sensor module.

In further features, the method further includes: based on the measured amount of VOCs, selectively operating at least one of: an air handler unit of a heating, ventilation, and air conditioning (HVAC) system; an air purifier configured to receive power via a standard wall outlet and to filter particulate from air within a building; and a ventilator configured to vent air out of the building from within the building.

In further features, the method further includes powering the IAQ sensor module using a battery of the IAQ sensor module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6-9 are example user interfaces displayed by a user computing device during execution of an application based on data received from a remote monitoring system;

In the drawings, reference numbers may be reused to identify similar and/or identical elements.

DETAILED DESCRIPTION

Figure 1:
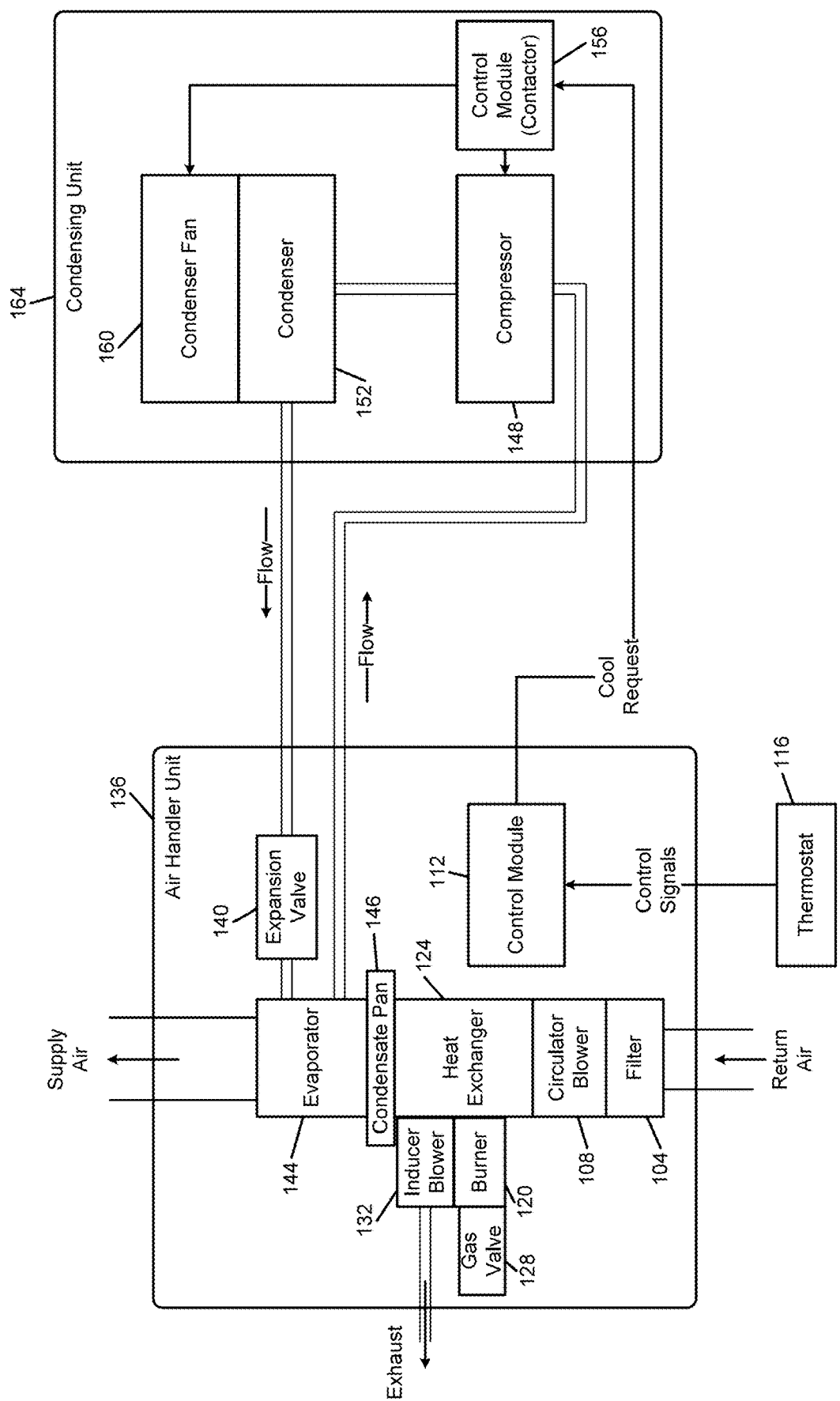
FIG. 1 is a block diagram of an example heating, ventilation, and air conditioning (HVAC) system.

According to the present disclosure, an indoor air quality (IAQ) sensor module can be used with one or more mitigation devices of a residential or light commercial HVAC (heating, ventilation, and/or air conditioning) system of a building and/or one or more other mitigation devices. The IAQ sensor module includes one, more than one, or all of a temperature sensor, a relative humidity (RH) sensor, a particulate sensor, a volatile organic compound (VOC) sensor, and a carbon dioxide ($CO_2$) sensor. The IAQ sensor module may also include one or more other IAQ sensors, such as occupancy, barometric pressure, light, sound, etc. The temperature sensor senses a temperature of air at the location of the IAQ sensor. The RH sensor measures a RH of air at the location of the IAQ sensor. The particulate sensor measures an amount (e.g., concentration) of particulate greater than a predetermined size in the air at the location of the IAQ sensor. The VOC sensor measures an amount of VOCs in the air at the location of the IAQ sensor. The carbon dioxide sensor measures an amount of carbon dioxide in the air at the location of the IAQ sensor. Other IAQ sensors would measure an amount of a substance or condition in the air at the location of the IAQ sensor.

The IAQ sensor module is wirelessly connected to a thermostat of the HVAC system, such as via a Bluetooth or WiFi. The IAQ sensor module may additionally or alternatively be wirelessly connected to a control module. The IAQ sensor module communicates measurements from its sensors, and optionally, a time and date to the thermostat and/or the control module. The control module and/or the thermostat controls operation of the mitigation devices based on the measurements from the IAQ sensor module. For example, the control module and/or the thermostat controls operation of the mitigation devices based on maintaining a temperature measured by the IAQ sensor module within a upper and lower temperature limits, based on maintaining a RH measured by the IAQ sensor within upper and lower RH limits, based on maintaining the amount of particulate in the air at the IAQ sensor module below a predetermined amount of particulate, based on maintaining the amount of VOCs in the air at the IAQ sensor module below a predetermined amount of VOCs, and/or based on maintaining the amount of carbon dioxide in the air at the IAQ sensor module below a predetermined amount of carbon dioxide.

The control module and/or the thermostat can provide information on the measurements of the IAQ sensor and other data (e.g., statuses of mitigation devices, local outdoor air conditions, etc.) to one or more user devices (e.g., of tenants, occupants, customers, contractors, etc.) associated with the building. For example, the building may be a single-family residence, and the customer may be the homeowner, a landlord, or a tenant. In other implementations, the building may be a light commercial building, and the customer may be the building owner, a tenant, or a property management company.

Some users may purchase multiple IAQ sensors for use within the building, such as one IAQ sensor for a first room of the building and a second IAQ sensor for a second room of the building. Differences between readings of the same type of sensor of the IAQ sensors, however, may cause users to lose trust in accuracy of measurements. For example, the user may lose trust in accuracy of the measurements of IAQ sensors if the amount of particulate measured by the particulate sensor of one IAQ sensor is X while the amount of particulate measured by the particulate sensor of another IAQ sensor is 3 times X or one-half of X.

According to the present disclosure, measurements of the same type of sensor (e.g., particulate, VOCs, carbon dioxide) of two or more IAQ sensors may be averaged when the IAQ sensors are located within a predetermined distance of each other and within one (i.e., the same) room of a building. The measurements of the same types of sensors should be approximately equal when the IAQ sensors are located within the predetermined distance of each other (in the proximity of each other) and within one room of the building.

Offsets for the sensors are determined based on differences between the average and the measurements of the sensors, respectively. The measurements of the sensors are adjusted based on the offsets, respectively. This normalizes the measurements of the sensors such that the sensors measurements are approximately equal. For example, an average of the amounts of particulate measured by the particulate sensors of two IAQ sensors may be determined. A first offset for a first one of the two particulate sensors is determined based on the measurement of the first one of the particulate sensors relative to the average. The measurements of the first one of the particulate sensors are adjusted based on the first offset. A second offset for the second one of the two particulate sensors is determined based on the measurement of the second one of the particulate sensors relative to the average. The measurements of the second one of the particulate sensors are adjusted based on the second offset.

Measurements of the sensors may also drift during operation. For example, measurements of a particulate sensor may increase over time as particulate accumulates within the particulate sensor. Measurements of a VOC sensor and measurements of a carbon dioxide sensor may increase over time as sensing elements of the VOC and carbon dioxide sensors saturate. Offsets for the sensors are determined to account for the drift in measurements of the sensors over time.

Resistances of the sensing elements of VOC and carbon dioxide sensors vary with the amount of VOCs and carbon dioxide in the air. The VOC and carbon dioxide sensors determine the amounts of VOCs and carbon dioxide based on their resistances relative to reference resistances calibrated to correspond to minimum values. If the amount of VOCs or the amount of carbon dioxide is different than the respective minimum value at calibration, however, the reference resistance will be too high or too low. The amounts of VOCs and/or the amounts of carbon dioxide will therefore also be higher or lower than actual.

According to the present disclosure, an IAQ sensor module is calibrated when the IAQ sensor module is outside of all buildings and is measuring outdoor ambient air. Specifically, the reference resistances of the VOC and carbon dioxide sensors are calibrated when the IAQ sensor module is located in outdoor ambient air. This is possible because the IAQ sensor is portable, such as solar powered, powered via a battery, or power able via an outdoor power receptacle. As an alternative to the IAQ sensor being outside, the VOC and carbon dioxide sensors can also be calibrated using lowest values achievable (or achieved) during a predetermined period (e.g., a first week) after initial system installation with all mitigation devices being used.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, ventilators, and air conditioners. HVAC systems as described in this application do not necessarily include both heating and air conditioning, and may instead have only one or the other.

In split HVAC systems, an air handler unit is often located indoors, and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—i.e., refrigerant evaporation occurs in what is labeled the condenser while refrigerant condensation occurs in what is labeled as the evaporator.

The control module and/or the thermostat upload data to a remote location. The remote location may be accessible via any suitable network, including the Internet. The remote location includes one or more computers, which will be referred to as servers. The servers execute a monitoring system on behalf of a monitoring company. Additionally or alternatively, a user computing device may serve as the monitoring system. The monitoring system receives and processes the data from the controller and/or thermostat of customers who have such systems installed. The monitoring system can provide performance information, diagnostic alerts, and error messages to one or more users associated with the building and/or third parties, such as designated HVAC contractors.

A server of the monitoring system includes a processor and memory. The memory stores application code that processes data received from the controller and/or the thermostat. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues (e.g., dirty filter) affecting effectiveness or efficiency of the HVAC system and/or the mitigating devices, and may receive notifications related to routine maintenance. The methods of notification may take the form of push or pull updates to an application, which may be executed on a smart phone, tablet, another type of mobile device, or on a computer (e.g., laptop or desktop). Notifications may also be viewed using web applications or on local displays, such as on the thermostat and/or other displays located throughout the building. Notifications may also include text messages, emails, social networking messages, voicemails, phone calls, etc.

Based on measurements from the control module, the thermostat, and/or the IAQ sensor module, the monitoring company can determine whether various components are operating at their peak performance. The monitoring company can advise the customer and a contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. A contractor can also be notified that a service call may be required. Depending on the contractual relationship between the customer and the contractor, the contractor may schedule a service call to the building.

The monitoring system may provide specific information to a contractor, such as identifying information of the customer's components, including make and model numbers, as well as indications of the specific part numbers of components. Based on this information, the contractor can allocate the correct repair personnel that have experience with the specific components and/or the system. In addition, a service technician is able to bring replacement parts, avoiding return trips after diagnosis.

Depending on the severity of the failure, the customer and/or contractor may be advised of relevant factors in determining whether to repair or replace some or all of the components. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure of components. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of a component. For example, failure of heating components of the HVAC system in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment and/or applying surcharges to repairs and service visits.

The monitoring service allows the customer to remotely monitor real-time data within the building, outside of the building, and/or control components of the system, such as setting temperature and RH setpoints and other IAQ setpoints, enabling or disabling heating, cooling, ventilation, air purification, etc. In addition, the customer may be able to track usage data for components of the system and/or historical data.

In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (e.g., below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Typically, the thermostat 116 includes a temperature sensor and a relative humidity (RH) sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature + and − a predetermined amount (e.g., 1, 2, 3, 4, 5 degrees Fahrenheit), respectively. The setpoint temperature may be set to a predetermined temperature by default and may be adjusted by a user.

Figure 2A:
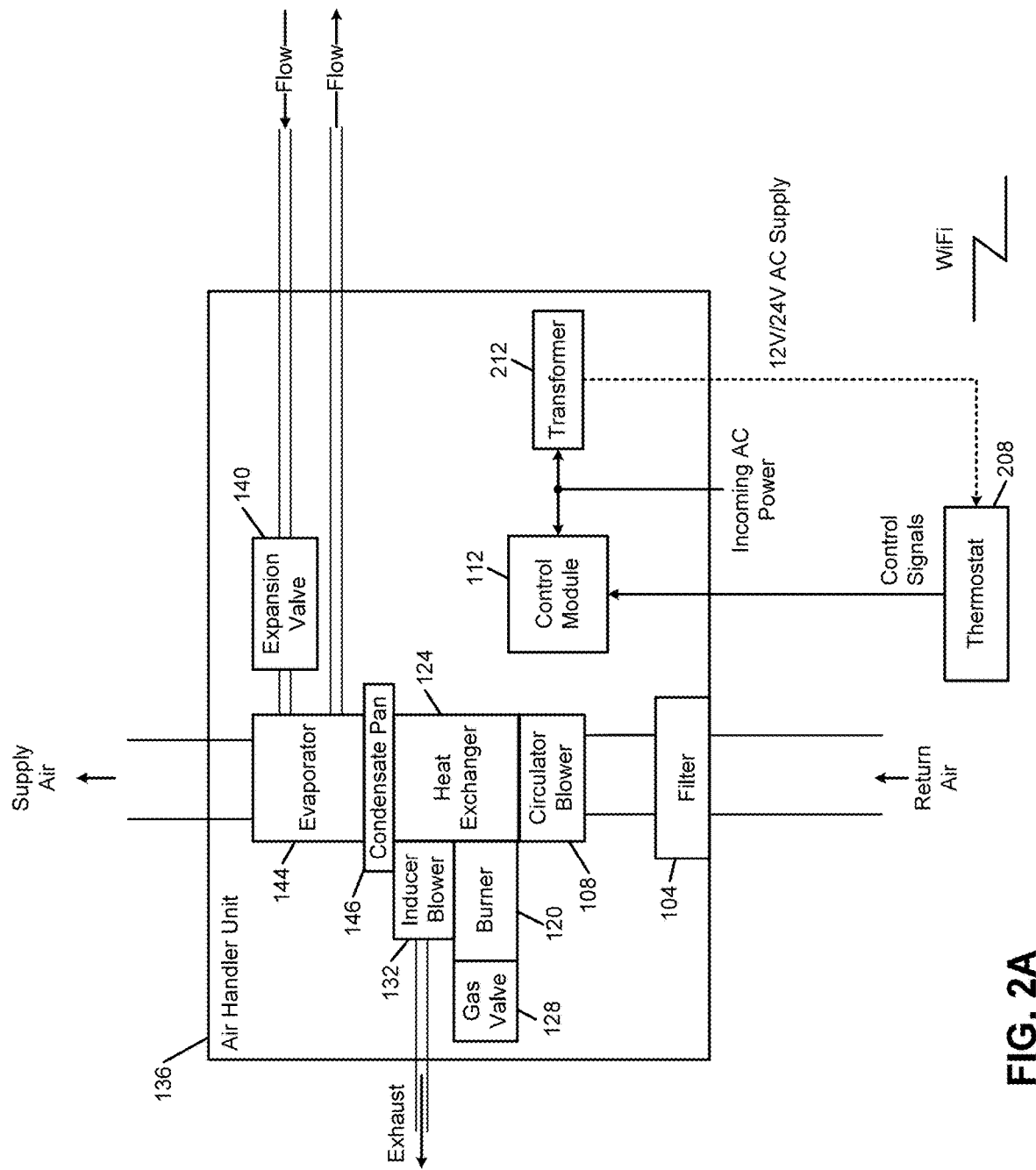
FIG. 2A is a functional block diagram of an air handler unit of an example HVAC system.
Figure 2B:
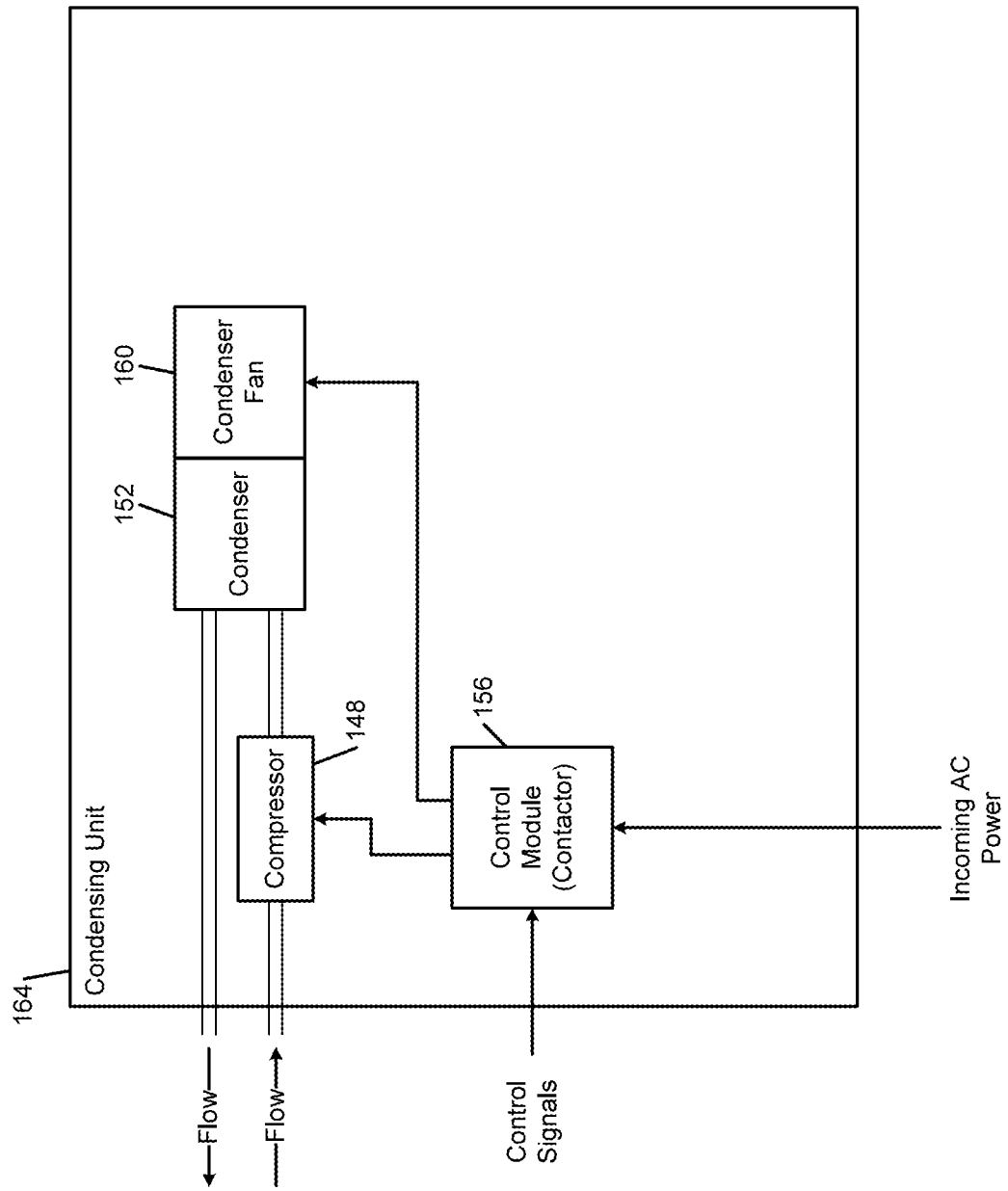
FIGS. 2B and 2C are functional block diagrams of example condenser units of example HVAC systems.

FIGS. 2A-2B are functional block diagrams of an example monitoring system associated with an HVAC system of a building. The air handler unit 136 of FIG. 1 is shown for reference. The thermostat 116 of FIG. 1 is a WiFi thermostat 208 having networking capability.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, a transformer 212 can be connected to an AC line in order to provide AC power to the control module 112 and the thermostat 208. For example, the transformer 212 may be a 10-to-1 transformer and therefore provide either a 12V or 24V AC supply depending on whether the air handler unit 136 is operating on nominal 120 volt or nominal 240 volt power.

The control module 112 controls operation in response to signals from the thermostat 208 received over control lines. The control lines may include a call for cool (cool request), a call for heat (heat request), and a call for fan (fan request). The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

Figure 2C:
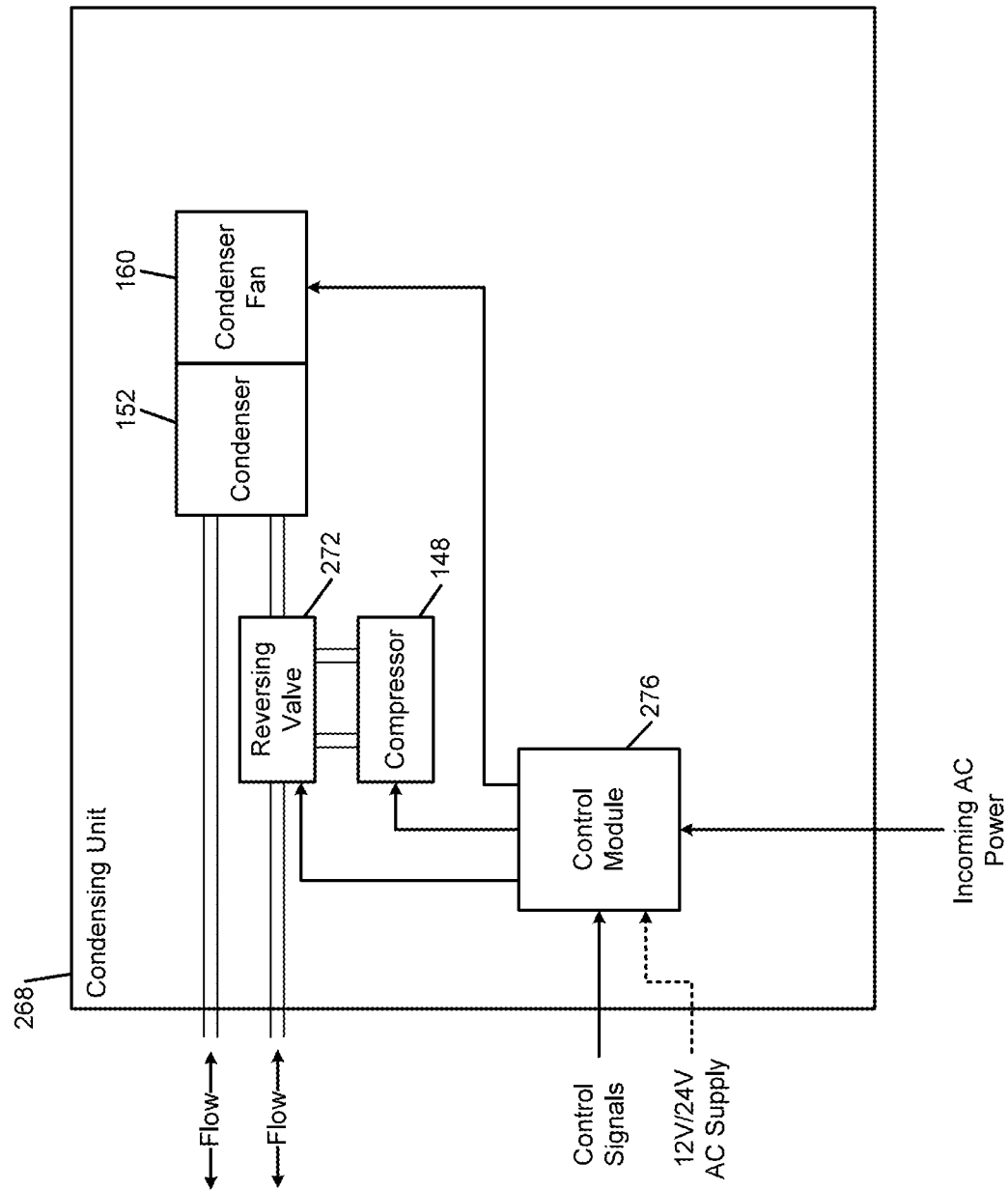

One or more of these control signals (on the control lines) is also transmitted to the condensing unit 164 (shown in FIGS. 2B and 2C). In various implementations, the condensing unit 164 may include an ambient temperature sensor that generates temperature data. When the condensing unit 164 is located outdoors, the ambient temperature represents an outside (or outdoor) ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on the geographical location of the building may be used to determine sun load, outside ambient air temperature, relative humidity, particulate, VOCs, carbon dioxide, etc.

In FIG. 2C, an example condensing unit 268 is shown for a heat pump implementation. The condensing unit 268 may be configured similarly to the condensing unit 164 of FIG. 2B. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power, for example, from the transformer 212 of the air handler unit 136 or via the incoming AC power line.

Figure 3A:
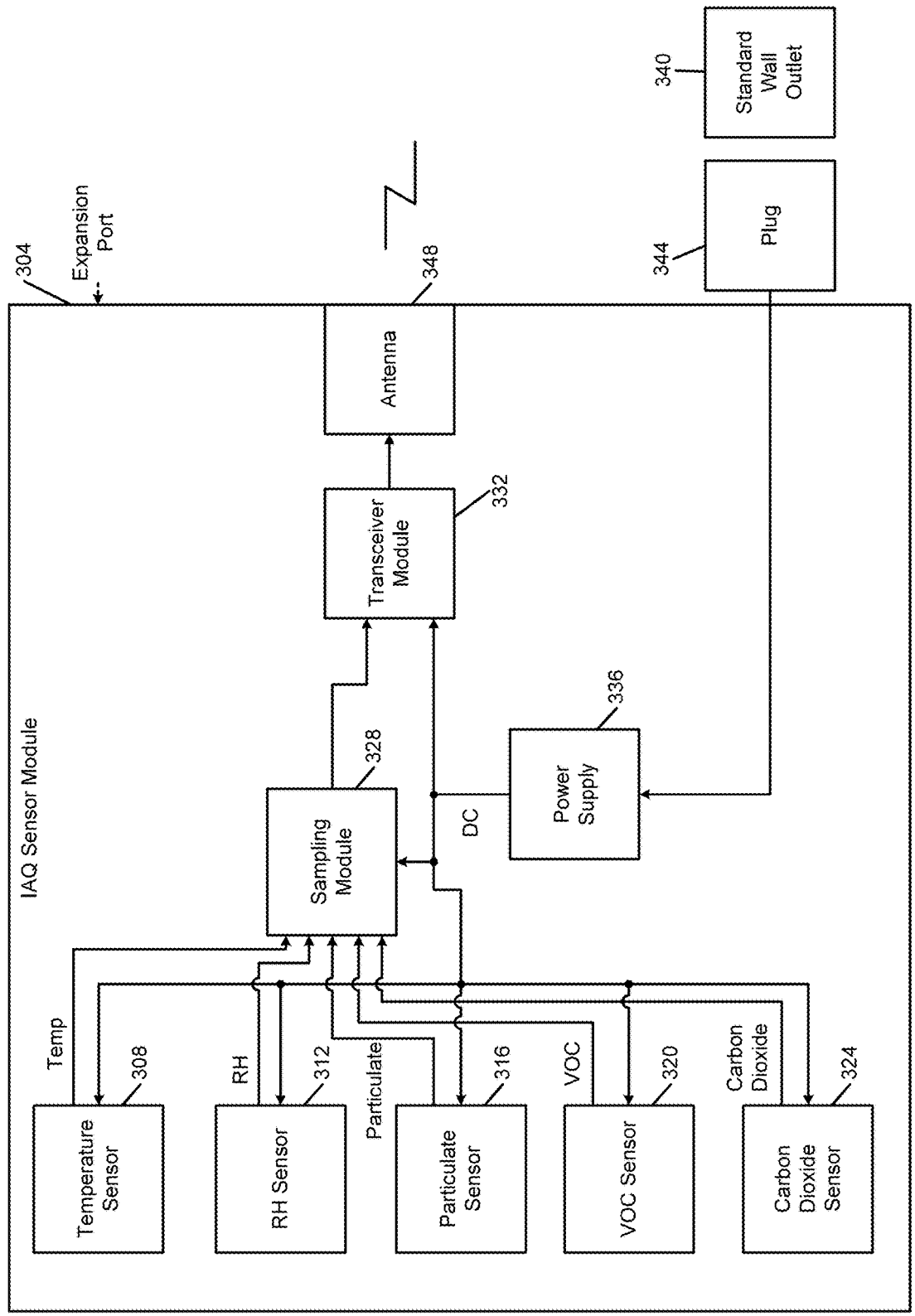
FIGS. 3A-3B include functional block diagrams including example indoor air quality (IAQ) sensor modules that can be used with an HVAC system and/or other mitigation devices.

FIG. 3A includes a functional block diagram of an example indoor air quality (IAQ) sensor module 304 that can be used with an HVAC system and/or one or more other mitigation devices. The IAQ sensor module 304 includes one, more than one, or all of: a temperature sensor 308, a relative humidity (RH) sensor 312, a particulate sensor 316, a volatile organic compounds (VOC) sensor 320, and a carbon dioxide sensor 324. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 volt or nominal 240 volt AC power. The power supply 336 may include an AC to direct current (DC) converter that converts the AC power into DC power, such as 5 volt, 12 volt, or 24 volt DC power. The power supply 336 supplies power to the components of the IAQ sensor module 304 including the sensors, the sampling module 328, and the transceiver module 332. While the example of the power supply 336 being integrated within the IAQ sensor module 304 is provided, the power supply 336 may be integrated with the plug 344 in various implementations. Also, while the example of the power supply 336 providing one DC voltage to the components of the IAQ sensor module 304, the power supply 336 may provide two or more different DC voltages to different components of the IAQ sensor module 304.

Figure 3B:
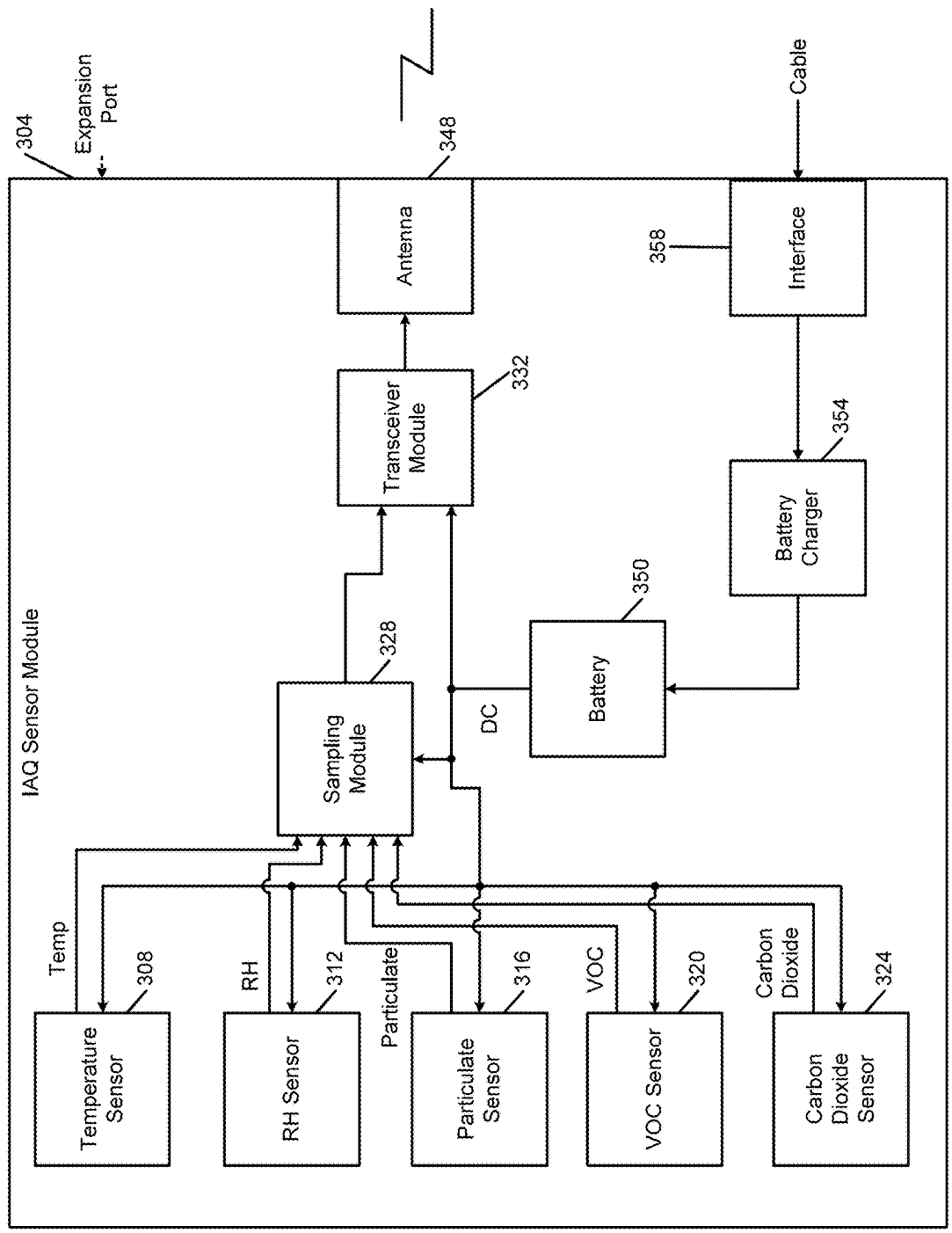

Additionally or alternatively, as shown in FIG. 3B, a battery 350 and/or one or more solar cells that supply power to the components of the IAQ sensor module 304. While the example of one battery is shown, the IAQ sensor module 304 may include more than one battery. The one or more batteries may be replaceable or non-replaceable. In the example of the one or more batteries being non-replaceable, the one or more batteries may be re-chargeable. A battery charger 354 may charge the one or more batteries. For example, the battery charger 354 may receive power via an interface port 358, such as a universal serial bus (USB) port, a DC input port, or another type of port. In various implementations, the interface port 358 may be omitted, and the battery charger 354 may be wired to receive power.

Referring to FIGS. 3A and 3B, the IAQ sensor module 304 is portable and can be moved into different rooms of a building. The IAQ sensor module 304 could also be placed outside the building, for example, to measure one or more conditions outside of the building, calibration, or for one or more other reasons.

The temperature sensor 308 measures a temperature of air at the IAQ sensor module 304. The RH sensor 312 measures a relative humidity of air at the IAQ sensor module 304. The particulate sensor 316 measures an amount (e.g., a mass flow rate, such as micrograms (µg) per cubic meter) of particulate in air at the IAQ sensor module 304 having a diameter that is less than a predetermined size (e.g., 2.5 or 10 micrometers (µm)). The VOC sensor 320 measures an amount (e.g., parts per billion (ppb)) of VOC in air at the IAQ sensor module 304. The carbon dioxide sensor 324 measures an amount (e.g., ppm) of carbon dioxide in air at the IAQ sensor module 304. The included ones of the temperature sensor 308, the RH sensor 312, the particulate sensor 316, the VOC sensor 320, and the carbon dioxide sensor 324 will be referred to collectively as the IAQ sensors. The parameters measured by the IAQ sensors will be referred to collectively as IAQ parameters.

The sampling module 328 samples (analog) measurements of the IAQ sensors. The sampling module 328 may also digitize and/or store values of the measurements of the IAQ sensors. In various implementations, the IAQ sensors may be digital sensors and output digital values corresponding to the respective measured parameters. In such implementations, the sampling module 328 may perform storage or may be omitted.

The IAQ sensor module 304 may include one or more expansion ports to allow for connection of additional sensors and/or to allow connection to other devices. Examples of other devices include one or more other IAQ sensor modules, one or more other types of the IAQ sensors not included in the IAQ sensor module 304, a home security system, a proprietary handheld device for use by contractors, a mobile computing device, and other types of devices.

The transceiver module 332 transmits frames of data corresponding to predetermined periods of time. Each frame of data may include the measurements of the IAQ sensors and data captured by the condition sensors over a predetermined period. One or more calculations may be performed for the data of each frame of data, such as averaging the measurements of one or more of the IAQ sensors. The measurements of the IAQ sensors may be sampled at a predetermined rate, such as 10 samples per minute or another suitable rate. Each frame may correspond to a predetermined number of sets of samples (e.g., 10). The measurements of the condition sensors may also be sampled at the predetermined rate or another (e.g., faster) predetermined rate. The monitoring system may provide visual representations of the measurements over predetermined periods of time along with other data, as discussed further below.

The transceiver module 332 transmits each frame (including the calculations, the measurements, and/or the captured data) to an IAQ control module 404 and/or the thermostat 208. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, WiFi (IEEE 802.11). The IAQ sensor module 304 may communicate directly with the IAQ control module 404 and/or the thermostat 208 or with a separate computing device, such as a smartphone, tablet, or another type of computing device. In various implementations, a gateway 408 is implemented, which creates a wireless network for the IAQ sensor module 304, the IAQ control module 404, and the thermostat 208. The gateway 408 may also interface with a customer router 412 using a wired or wireless protocol, such as Ethernet (IEEE 802.3).

Figure 4A:
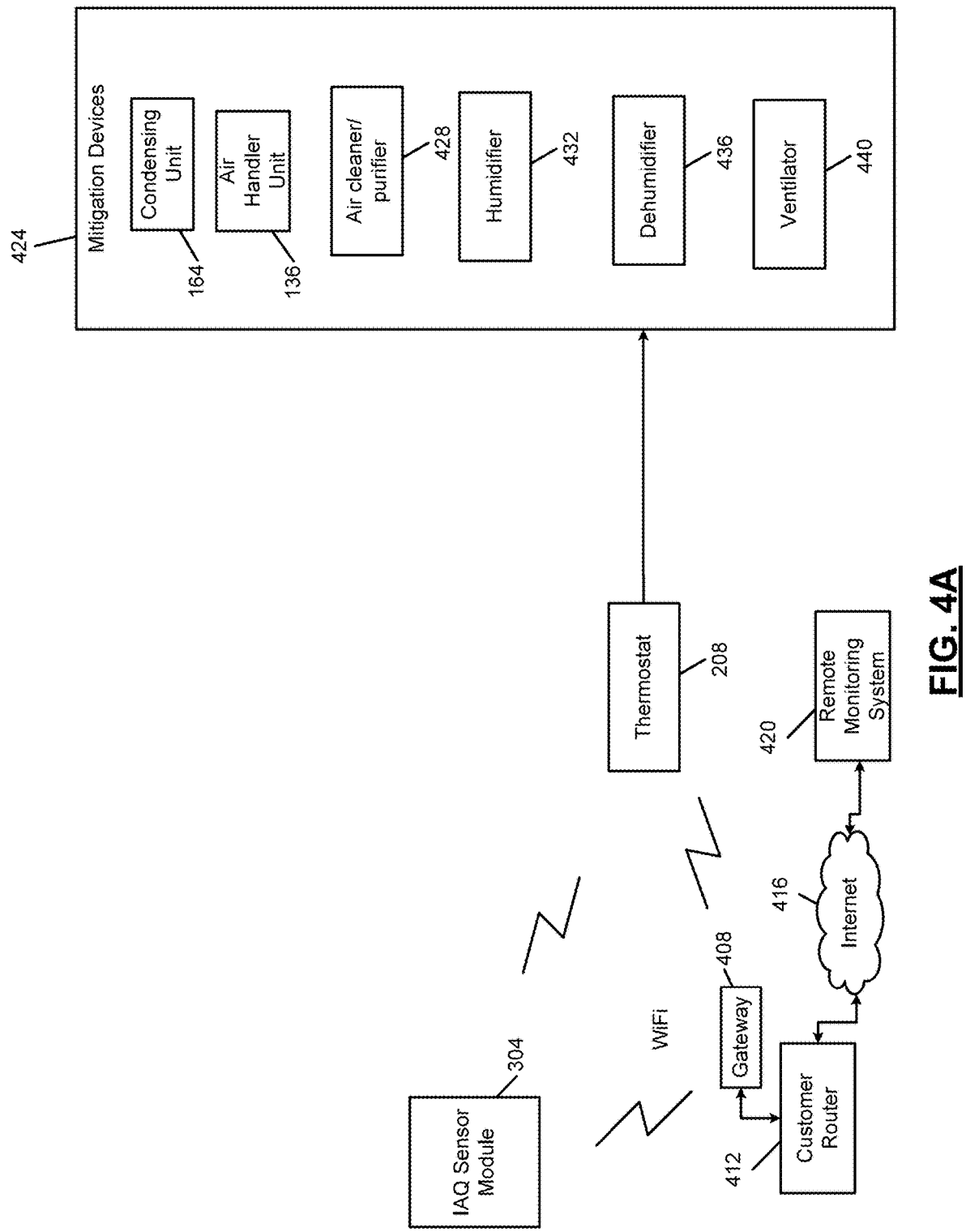
FIGS. 4A-4C are a functional block diagram of an example IAQ control system.
Figure 4B:
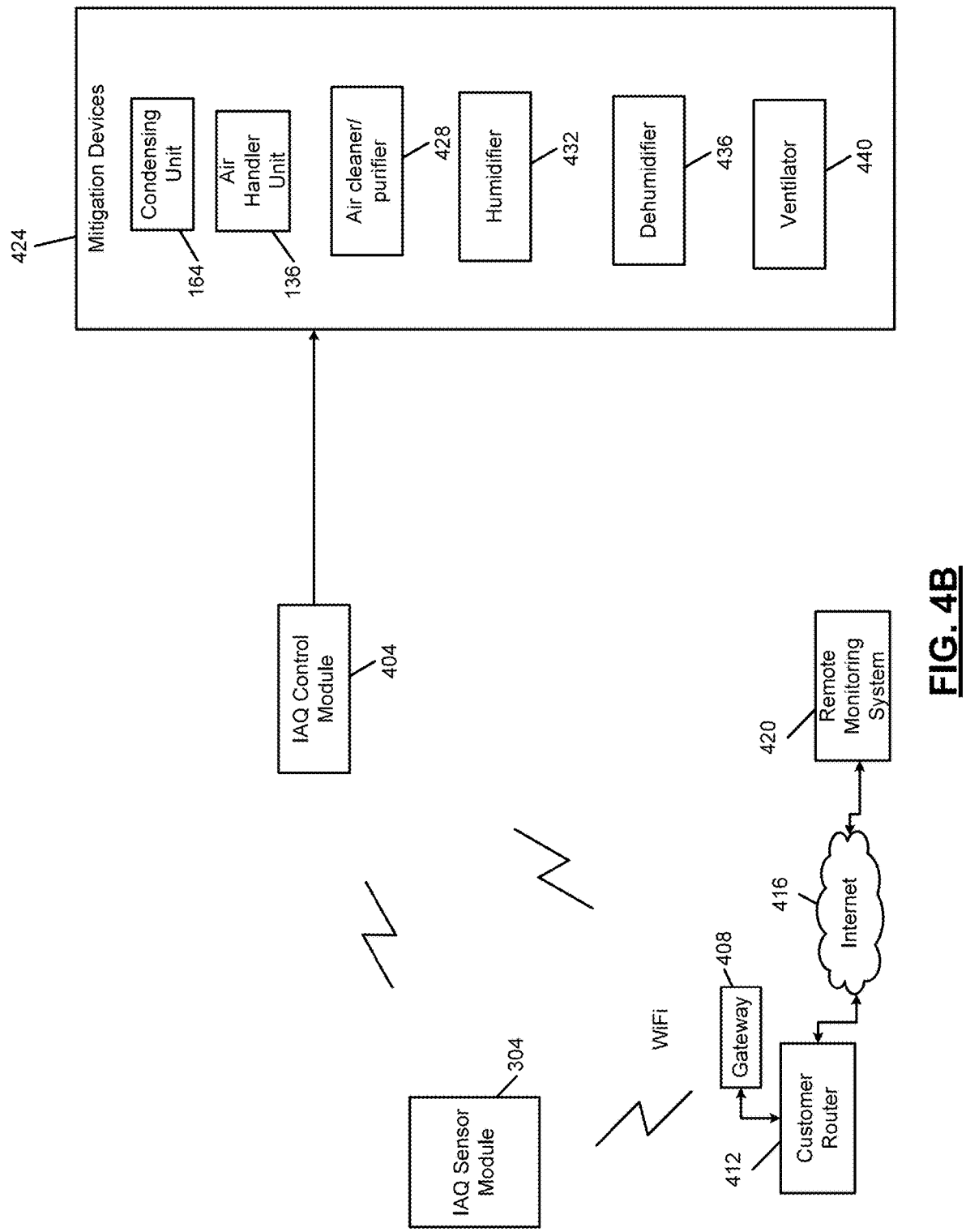
Figure 4C:
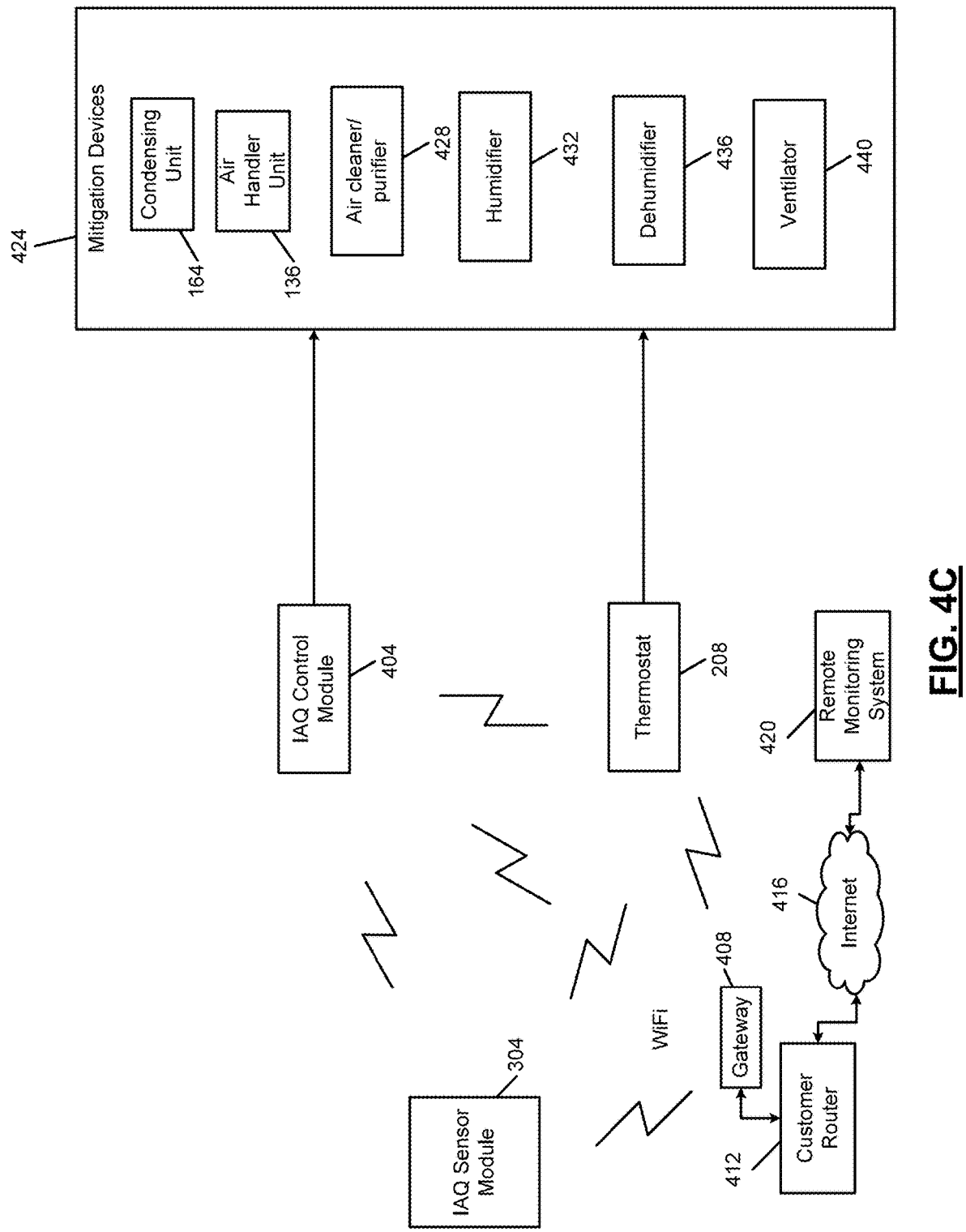

Referring now to FIGS. 4A-4C, functional block diagrams of example IAQ control systems are presented. The IAQ control module 404 may communicate with the customer router 412 using WiFi. Alternatively, the IAQ control module 404 may communicate with the customer router 412 via the gateway 408. The thermostat 208 may also communicate with the customer router 412 using WiFi or via the gateway 408. In various implementations, the IAQ control module 404 and the thermostat 208 may communicate directly or via the gateway 408.

The IAQ sensor module 304, the IAQ control module 404, and/or the thermostat 208 transmits data measured by the IAQ sensor module 304 and parameters of the IAQ control module 404 and/or the thermostat 208 over a wide area network 416, such as the Internet (referred to as the Internet 416). The IAQ sensor module 304, the IAQ control module 404, and/or the thermostat 208 may access the Internet 416 using the customer router 412 of the customer. The customer router 412 may already be present to provide Internet access to other devices (not shown) within the building, such as a customer computer and/or various other devices having Internet connectivity, such as a DVR (digital video recorder) or a video gaming system.

The IAQ sensor module 304, the IAQ control module 404, and/or the thermostat 208 transmit the data to a remote monitoring system 420 via the Internet 416 using the customer router 412. Further discussion of the remote monitoring system 420 is provided below.

The IAQ control module 404 and/or the thermostat 208 control operation (e.g., on, off, speed, etc.) of mitigation devices 424 based on the measurements from the IAQ sensor module 304. For example, the measurements of the IAQ sensor module 304 may be provided to the thermostat 208 and the thermostat 208 may control operation of the mitigation devices 424 in various implementations (e.g., FIG. 4A). The IAQ control module 404 can be omitted in such implementations. While the example of the thermostat 208 controlling the mitigation devices 424 will be discussed, alternatively the IAQ control module 404 may control operation of the mitigation devices 424 (e.g., FIG. 4B), or the thermostat 208 and the IAQ control module 404 may together control the mitigation devices 424 (e.g., FIG. 4C).

The IAQ control module 404 and/or the thermostat 208 control and communicate with the mitigation devices 424 wirelessly, by wire, using a combination of wireless and wired connections. In the case of wireless control and communication, the IAQ control module 404, the thermostat 208, and the mitigation devices 424 include respective transceivers.

The mitigation devices 424 include: (i) the condensing unit 164, (ii) the air handler unit 136 (e.g., the circulator blower 108), (iii) an air cleaner/purifier 428, (iv) a humidifier 432, (v) a dehumidifier 436, and (vi) a ventilator 440. The air cleaner/purifier 428 may be separate from the air handler unit 136 (e.g., a standalone air cleaner/purifier). In various implementations, the air handler unit 136 may serve as the air cleaner/purifier 428. The air cleaner/purifier 428 draws in air and forces the air through a filter before expelling filtered air to the building. The filter may be rated (e.g., minimum efficiency reporting value, MERV) to remove a predetermined amount (e.g., 95%) of particulate of the size measured by the particulate sensor 316. Operation of the air cleaner/purifier 428 may include whether the air cleaner/purifier 428 is on or off and, when on, a speed of the air cleaner/purifier 428. The air cleaner/purifier 428 may have a single speed or multiple discrete speeds.

Operation of the air cleaner/purifier 428 may be controlled via wire or wirelessly by the thermostat 208. Examples of wireless communication and control include, but are not limited to, Bluetooth connections and WiFi connections. For example only, the thermostat 208 may wirelessly control whether the air cleaner/purifier 428 is on or off and, if on, the speed of the air cleaner/purifier 428. As one example, the thermostat 208 may turn the air cleaner/purifier 428 on when the amount of particulate measured by the particulate sensor 316 is greater than a first predetermined amount of particulate. The thermostat 208 may leave the air cleaner/purifier 428 on until the amount of particulate measured by the particulate sensor 316 is less than a second predetermined amount of particulate that is less than the first predetermined amount of particulate. The thermostat 208 may turn the air cleaner/purifier 428 off when the amount of particulate measured by the particulate sensor 316 is less than the second predetermined amount of particulate. In various implementations, the thermostat 208 may vary the speed of the air cleaner/purifier 428 based on the amount of particulate measured by the particulate sensor 316. For example, the thermostat 208 may increase the speed of the air cleaner/purifier 428 as the amount of particulate increases and vice versa.

The humidifier 432 humidifies air within the building. The humidifier 432 may be included with the air handler unit 136 or a standalone humidifier. For example, when included with the air handler unit 136, the humidifier 432 may add moisture to the supply air before the supply air is output from vents to the building. The humidifier 432 may add moisture to air, for example, by supplying water to a medium (e.g., a pad) and forcing air (e.g., supply air) through the hydrated medium. Alternatively, the humidifier 432 may spray water in the form of mist into air (e.g., supply air). In the example of a standalone humidifier, the humidifier 432 may spray water in the form of mist into air.

Operation of the humidifier 432 may include whether the humidifier 432 is on or off. In various implementations, operation of the humidifier 432 may also include a humidification rate (e.g., an amount of water supplied to the pad or into the air as mist). The humidifier 432 may be configured to provide only a single humidification rate or multiple different humidification rates.

Operation of the humidifier 432 may be controlled via wire or wirelessly by the thermostat 208. For example only, the thermostat 208 may control (by wire) whether the humidifier 432 included with the air handler unit 136 is on or off. As another example, if the humidifier 432 is implemented separately from the air handler unit 136, the thermostat 208 may wirelessly control whether the humidifier 432 is on or off and a humidification rate when on. Examples of wireless communication include, but are not limited to, Bluetooth connections and WiFi connections. For example only, the thermostat 208 may turn the humidifier 432 on when the RH measured by the RH sensor 312 is less than a first predetermined RH. The thermostat 208 may leave the humidifier 432 on until the RH measured by the RH sensor 312 is greater than a second predetermined RH that is greater than the first predetermined RH. The thermostat 208 may turn the humidifier 432 off when the RH measured by the RH sensor 312 is greater than the second predetermined RH.

The dehumidifier 436 dehumidifies (i.e., removes humidity from) air within the building. The dehumidifier 436 may be included with the air handler unit 136 or a standalone dehumidifier. For example, the dehumidifier 436 may draw moisture from the supply air (or add dry air to the supply air) before the supply air is output from vents to the building. Operation of the dehumidifier 436 may include whether the dehumidifier 436 is on or off.

Operation of the dehumidifier 436 may be controlled via wire or wirelessly by the thermostat 208. For example only, the thermostat 208 may control (by wire) whether the dehumidifier 436 included with the air handler unit 136 is on or off. As another example, the thermostat 208 may wirelessly control whether the dehumidifier 436, implemented as a standalone device, is on or off. For example only, the thermostat 208 may turn the dehumidifier 436 on when the RH measured by the RH sensor 312 is greater than a third predetermined RH. The third predetermined RH may be the same as the second predetermined RH or different than (e.g., greater than) the second predetermined RH. The thermostat 208 may leave the dehumidifier 436 on until the RH measured by the RH sensor 312 is less than a fourth predetermined RH that is less than the third predetermined RH. The thermostat 208 may turn the dehumidifier 436 off when the RH measured by the RH sensor 312 is less than the fourth predetermined RH. The fourth predetermined RH may be the same as the first predetermined RH or different than (e.g., greater than) the first predetermined RH.

The ventilator 440 vents air from within the building out of the building. This also passively draws air from outside of the building into the building. The ventilator 440 may be included with the air handler unit 136 (e.g., the inducer blower 132) or a standalone ventilator. Examples of standalone ventilators include blowers that blow air from within the building out of the building (e.g., range hoods fans, bathroom fans, the inducer blower, etc.). Operation of the ventilator 440 may include whether the ventilator 440 is on or off and, when on, a speed. The ventilator 440 may be configured to operate at a single speed or multiple different speeds.

Operation of the ventilator 440 may be controlled via wire or wirelessly by the thermostat 208. For example only, the thermostat 208 may wirelessly control whether the ventilator 440 is on or off and, if on, the speed of the ventilator 440. As one example, the thermostat 208 may turn the ventilator 440 on when the amount of VOCs measured by the VOC sensor 320 is greater than a first predetermined amount of VOCs. The thermostat 208 may leave the ventilator 440 on until the amount of VOCs measured by the VOC sensor 320 is less than a second predetermined amount of VOCs that is less than the first predetermined amount of VOCs. The thermostat 208 may turn the ventilator 440 off when the amount of VOCs measured by the VOC sensor 320 is less than the second predetermined amount of VOCs.

As another example, the thermostat 208 may turn the ventilator 440 on when the amount of carbon dioxide measured by the carbon dioxide sensor 324 is greater than a first predetermined amount of carbon dioxide. The thermostat 208 may leave the ventilator 440 on until the amount of carbon dioxide measured by the carbon dioxide sensor 324 is less than a second predetermined amount of carbon dioxide that is less than the first predetermined amount of carbon dioxide. The thermostat 208 may turn the ventilator 440 off when the amount of carbon dioxide measured by the carbon dioxide sensor 324 is less than the second predetermined amount of carbon dioxide.

The mitigation devices described above are only described as example. One or more of the example mitigation devices may be omitted. One or more other types of mitigation devices may be included. Additionally, while the example of only one of each type of mitigation device is provided, two or more of a given type of mitigation device may be included and controlled.

Changes in temperature and/or humidity also cause changes in particulate, VOCs, and/or carbon dioxide. For example, a change in temperature may cause a change in VOCs, RH, particulate, and/or carbon dioxide. As another example, a change in RH may cause a change in particulate, VOCs, and/or carbon dioxide. For example, particulate may increase as RH increases and vice versa.

The thermostat 208 therefore controls operation of the mitigation devices 424 based on all of the parameters measured by the IAQ sensor module 304 in an attempt to: adjust the temperature within a predetermined temperature range, adjust the RH within a predetermined RH range, adjust the amount of particulate (if measured) to less than a predetermined amount of particulate, adjust the amount of VOCs (if measured) to less than a predetermined amount of VOCs, and to adjust the amount of carbon dioxide (if measured) to less than a predetermined amount of carbon dioxide.

Figure 5A:
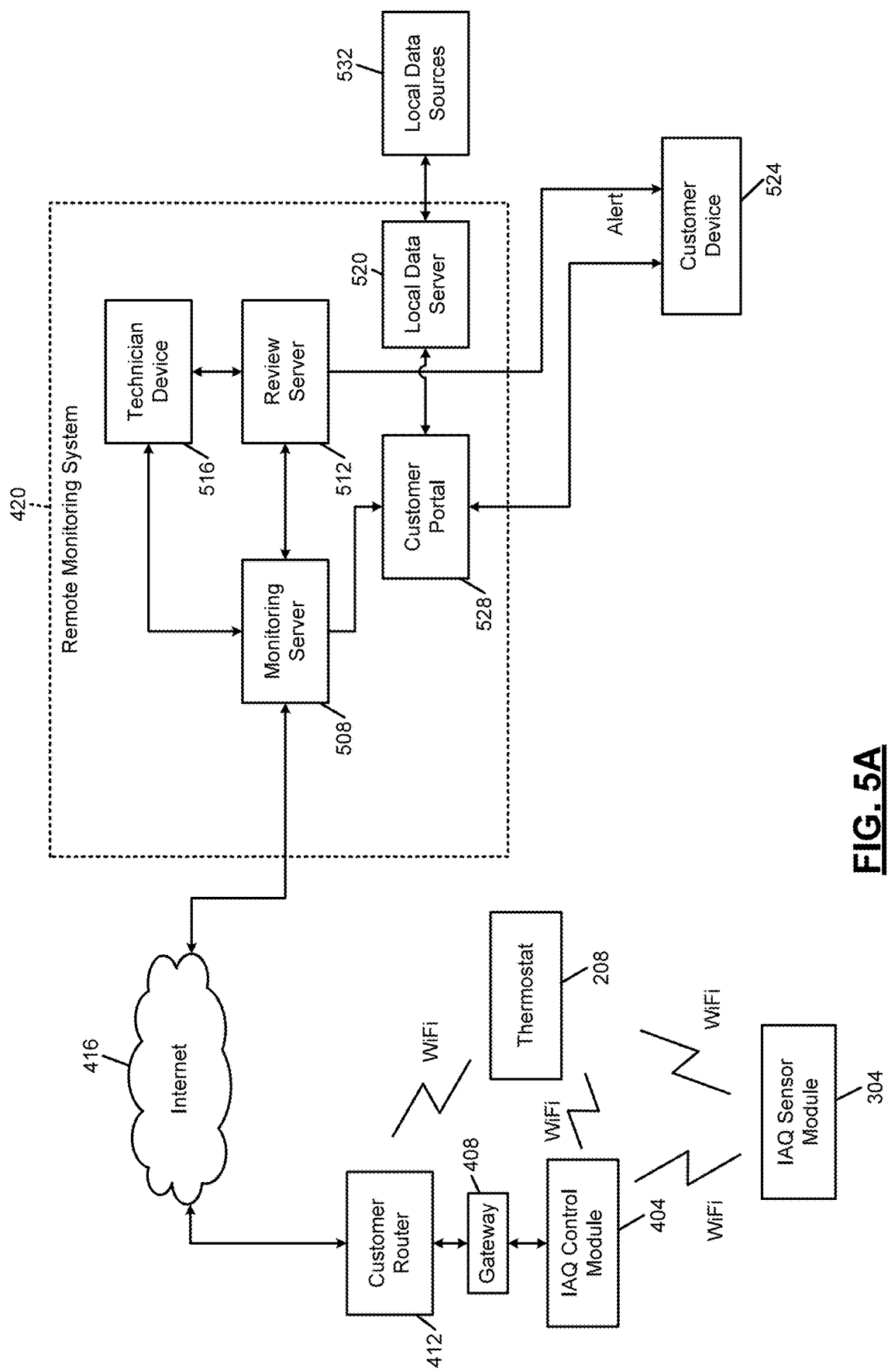
FIG. 5A is a functional block diagram of an example remote monitoring system.

FIG. 5A includes a functional block diagram of an example monitoring system. In FIG. 5A, the IAQ control module 404 and/or the thermostat 208 are shown transmitting, using the customer router 412, data to the remote monitoring system 420 via the Internet 416. In other implementations, the IAQ control module 404 and/or the thermostat 208 may transmit the data to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 420 includes a monitoring server 508 that receives data from the IAQ control module 404 and/or the thermostat 208 and maintains and verifies network continuity with the IAQ control module 404 and/or the thermostat 208. The monitoring server 508 executes various algorithms to store setpoints for the building and to store measurements from the thermostat 208 and/or the IAQ sensor module 304 taken over time.

The monitoring server 508 may notify a review server 512 when one or more predetermined conditions are satisfied. This programmatic assessment may be referred to as an advisory. Some or all advisories may be triaged by a technician to reduce false positives and potentially supplement or modify data corresponding to the advisory. For example, a technician device 516 operated by a technician may be used to review the advisory and to monitor data (in various implementations, in real-time) from the IAQ control module 404 and/or the thermostat 208 via the monitoring server 508.

A technician using the technician device 516 may review the advisory. If the technician determines that a problem or fault is either already present or impending, the technician instructs the review server 512 to send an alert to a customer device 524 that is associated with the building. The technician may be determine that, although a problem or fault is present, the cause is more likely to be something different than specified by the automated advisory. The technician can therefore issue a different alert or modify the advisory before issuing an alert based on the advisory. The technician may also annotate the alert sent to the customer device 524 with additional information that may be helpful in identifying the urgency of addressing the alert and presenting data that may be useful for diagnosis or troubleshooting.

In various implementations, minor problems may not be reported to the customer device 524 so as not to alarm the customer or inundate the customer with alerts. The review server 512 (or a technician) may determine whether a problem is minor based on a threshold. For example, an efficiency decrease greater than a predetermined threshold may be reported to the customer device 524, while an efficiency decrease less than the predetermined threshold may not be reported to the customer device 524.

In various implementations, the technician device 516 may be remote from the remote monitoring system 420 but connected via a wide area network. For example only, the technician device 516 may include a computing device such as a laptop, desktop, smartphone, or tablet.

Using the customer device 524 executing an application, the customer can access a customer portal 528, which provides historical and real-time data from the IAQ control module 404 and/or the thermostat 208. The customer portal 528 may also provide setpoints and predetermined ranges for each of the measurements, local outdoor air quality data, statuses of the mitigation devices 424 (e.g., on or off), and other data to the customer device 524. Via the customer device 524, the customer may change the setpoints and predetermined ranges. The monitoring server 508 transmits changed setpoints and predetermined ranges to the thermostat 208 and/or the IAQ control module 404 for use in controlling operation of the mitigation devices 424.

The remote monitoring system 420 includes a local data server 520 that obtains local data at (outside) the building. The local data server 520 may obtain the local data from one or more local data sources 532 via a wide area network, such as the internet 416, using a geographical location of the building. The geographical location may be, for example, an address, zip code, coordinates, or other geographical identifier of the building. The remote monitoring system 420 may obtain the geographical location of the building, for example, via the customer device 524 before providing data to the customer device 524. The local data includes, for example, air temperature within a predetermined geographical area including the geographical location of the building, RH within the predetermined geographical area, amount of VOCs in the air within the predetermined geographical area, amount of particulate of the predetermined size measured by the particulate sensor 316 within the predetermined geographical area, and amount of carbon dioxide within the predetermined geographical area.

Figure 5B:
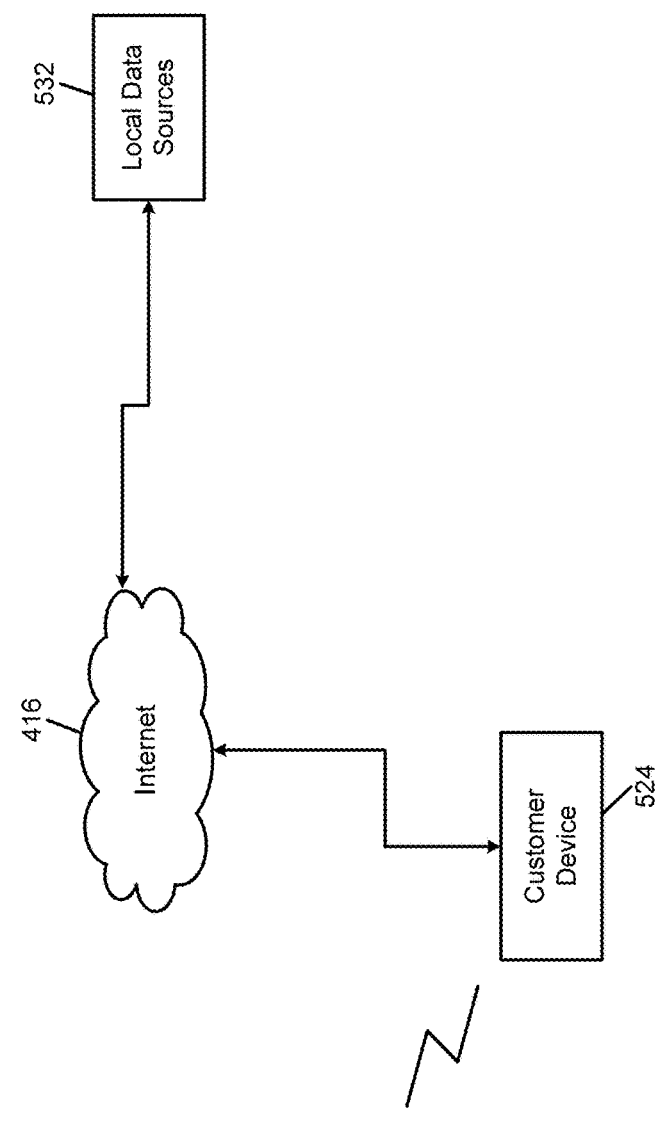
FIG. 5B is a functional block diagram of an example monitoring system.
Figure 5B:
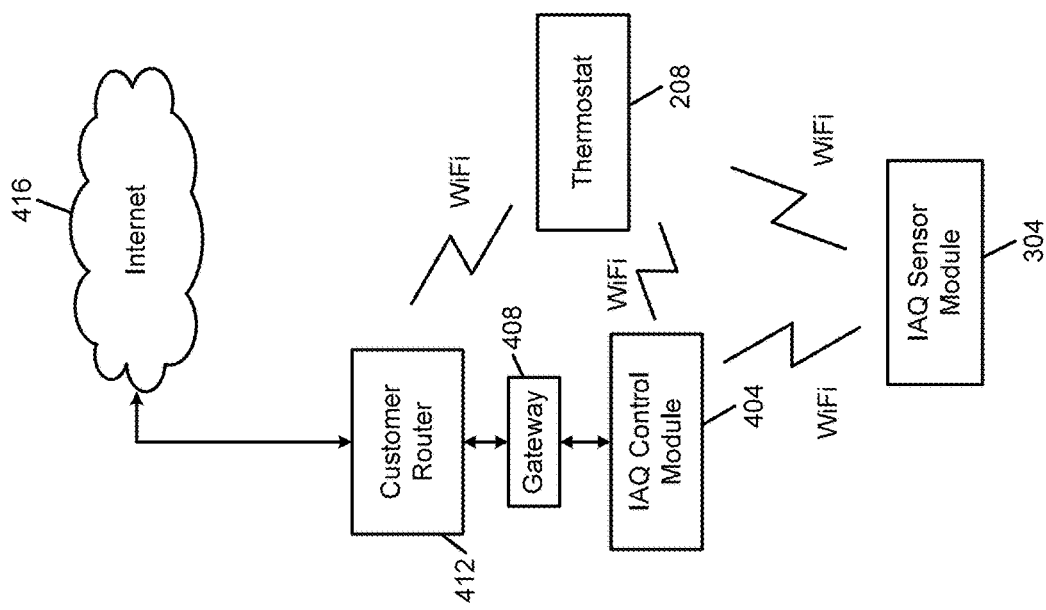

FIG. 5B includes a functional block diagram of an example monitoring system where the customer device 524 serves as a monitoring system and provides the functionality of the remote monitoring system 420. The thermostat 208 and/or the IAQ control module 404 transmit data to the customer device 524 wirelessly, such as via a Bluetooth connection, WiFi, or another wireless connection. The customer device 524 may obtain the local data from the local data sources 532 via a wide area network, such as the internet 416. Alternatively, the IAQ control module 404 or the thermostat 208 may serve as a monitoring system and provide the functionality of the remote monitoring system 420.

Figure 6:
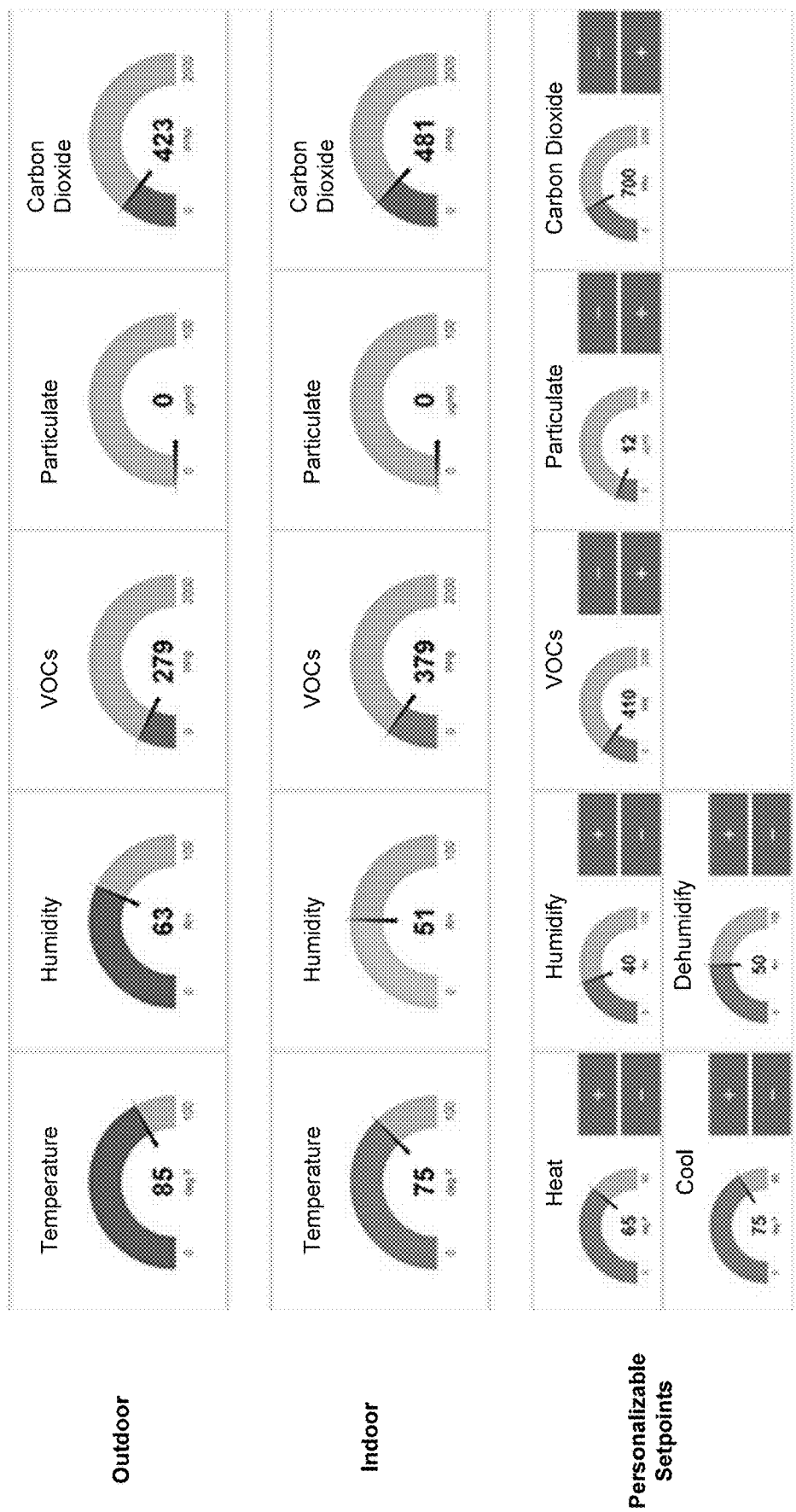

FIG. 6 includes an example user interface displayed by the customer device 524 during execution of the application based on data from the customer portal 528. It should be understood that the following functions are performed by the customer device 524 during execution of the application.

As shown in FIG. 6, the customer device 524 may display real-time values of the temperature, RH, amount of VOCs, amount of particulate, and amount of carbon dioxide (CO2) measured by the IAQ sensor module 304. In FIG. 6, these are illustrated in the row labeled "indoor" as they represent parameters within the building. The real-time values may be received by the customer device 524 from the monitoring server 508 via the customer portal 528.

The customer device 524 may also display real-time values of the temperature, RH, amount of VOCs, amount of particulate, and amount of carbon dioxide (CO2) measured outside of the building but within the predetermined geographical area including the geographical area of the building. In FIG. 6, these are illustrated in the row labeled "outdoor" as they represent parameters outside of the building. The real-time values may be received by the customer device 524 from the monitoring server 508 via the customer portal 528.

The customer device 524 may also display present setpoints for beginning heating (Heat) of the building, cooling (Cool) of the building, humidification (Humidify), dehumidification (Dehumidify), VOC removal (VOCs), particulate removal (Particulate), and carbon dioxide removal (Carbon Dioxide). In FIG. 6, these setpoints are illustrated in the row labeled "setpoints" as they represent setpoints for beginning associated mitigation actions within the building. The present setpoints may be received by the customer device 524 from the monitoring server 508 via the customer portal 528.

A predetermined range for a measurement may be set based on the setpoint for a measurement. For example, a predetermined range for heating may be set to the temperature setpoint for heating plus and minus a predetermined amount. A predetermined range for cooling may be set to the temperature setpoint for cooling plus and minus a predetermined amount. The predetermined amount may be user adjustable in various implementations.

The customer device 524 also allows a user to adjust one or more of the present setpoints via the customer device 524. For example, the customer device 524 may provide positive and negative adjustment inputs in association with one, more than one, or all of the setpoints to allow for adjustment of the present setpoints. FIG. 6 includes the example of + serving as the positive adjustment input and − serving as the negative adjustment input. Adjustment inputs labeled and provided differently, however, may be used.

In response to receipt of input indicative of user interaction (e.g., touching, clicking, etc.) with an adjustment input associated with a setpoint, the customer device 524 may transmit a command to the monitoring server 508 to adjust (i.e., increment or decrement) the setpoint by a predetermined amount. For example, in response to receipt of input indicative of user interaction (e.g., touching, clicking, etc.) with the positive adjustment input associated with the heating temperature setpoint, the customer device 524 may transmit a command to the monitoring server 508 to increment the heating temperature setpoint by a first predetermined amount. In response to receipt of input indicative of user interaction (e.g., touching, clicking, etc.) with the negative adjustment input associated with the heating temperature setpoint, the customer device 524 may transmit a command to the monitoring server 508 to decrement the heating temperature setpoint by the first predetermined amount. As another example, in response to receipt of input indicative of user interaction (e.g., touching, clicking, etc.) with the positive adjustment input associated with the humidification RH setpoint, the customer device 524 may transmit a command to the monitoring server 508 to increment the humidification RH setpoint by a second predetermined amount. In response to receipt of input indicative of user interaction (e.g., touching, clicking, etc.) with the negative adjustment input associated with the humidification RH setpoint, the customer device 524 may transmit a command to the monitoring server 508 to decrement the humidification RH setpoint by the second predetermined amount.

The monitoring server 508 relays (transmits) received commands for adjusting setpoints to the thermostat 208 and/or the IAQ control module 404 via the internet 416. Alternatively, the customer device 524 may transmit commands for adjusting setpoints to the thermostat 208 and/or the IAQ control module 404 directly or via the internet 416. The thermostat 208 and/or the IAQ control module 404 adjust the associated setpoints in response to the commands received from the monitoring server 508.

Figure 7:
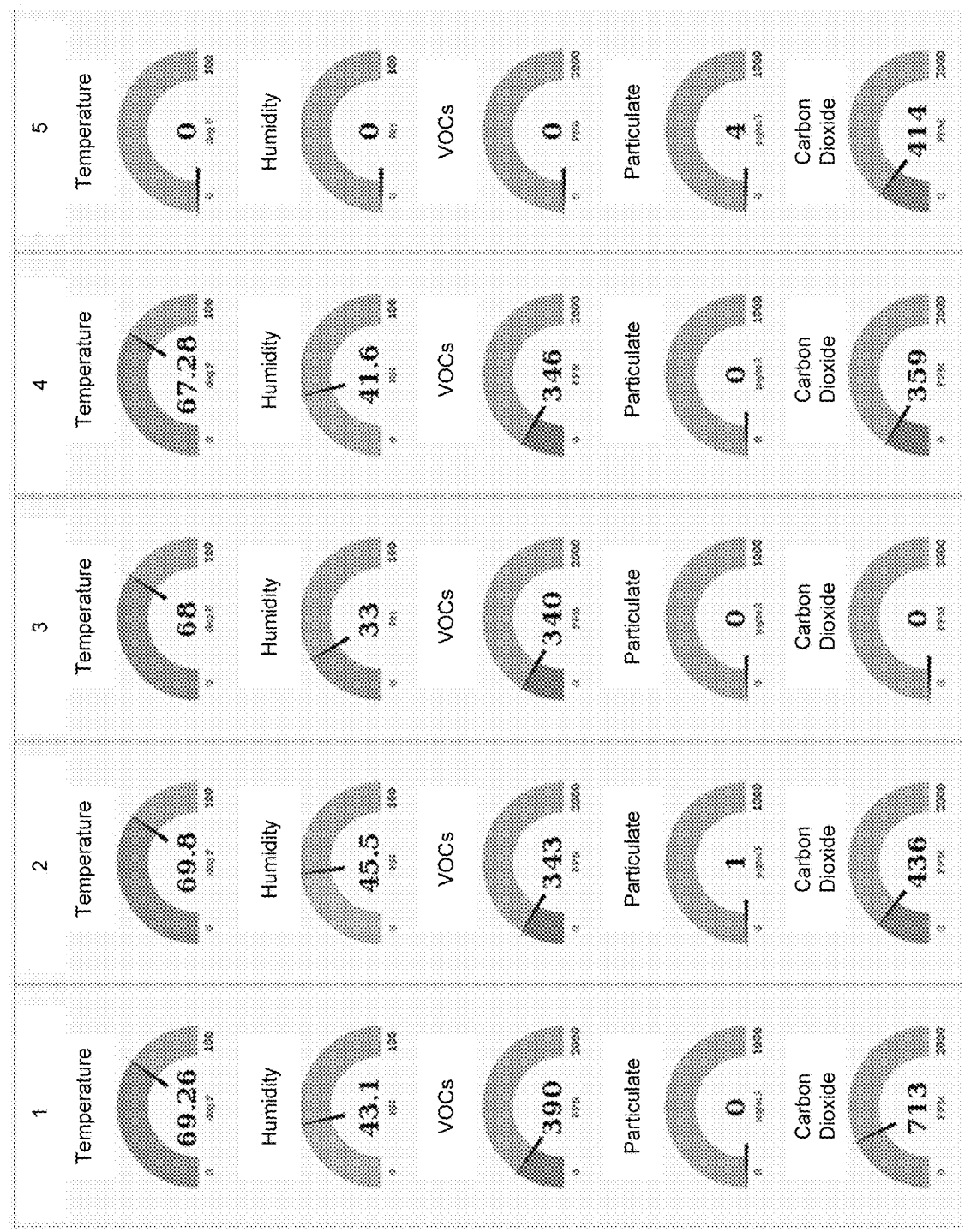

As discussed above, one or more than one IAQ sensor module 304 may be concurrently used within the building, such as in different rooms of the building. FIG. 7 includes an example user interface displayed by the customer device 524 during execution of the application when the building includes multiple IAQ sensor modules. In the example of FIG. 7, the measurements from each IAQ sensor module are shown in a separate column.

As also discussed above, one or more of the IAQ sensors may be omitted from an IAQ sensor module. For example, as shown in the right-most column of FIG. 7, the associated IAQ sensor module only includes a particulate sensor and a carbon dioxide sensor. The temperature, relative humidity, and VOCs of zero in the example of FIG. 7 indicate that the IAQ sensor module does not include a temperature sensor, a humidity sensor, or a VOC sensor.

Figure 8:
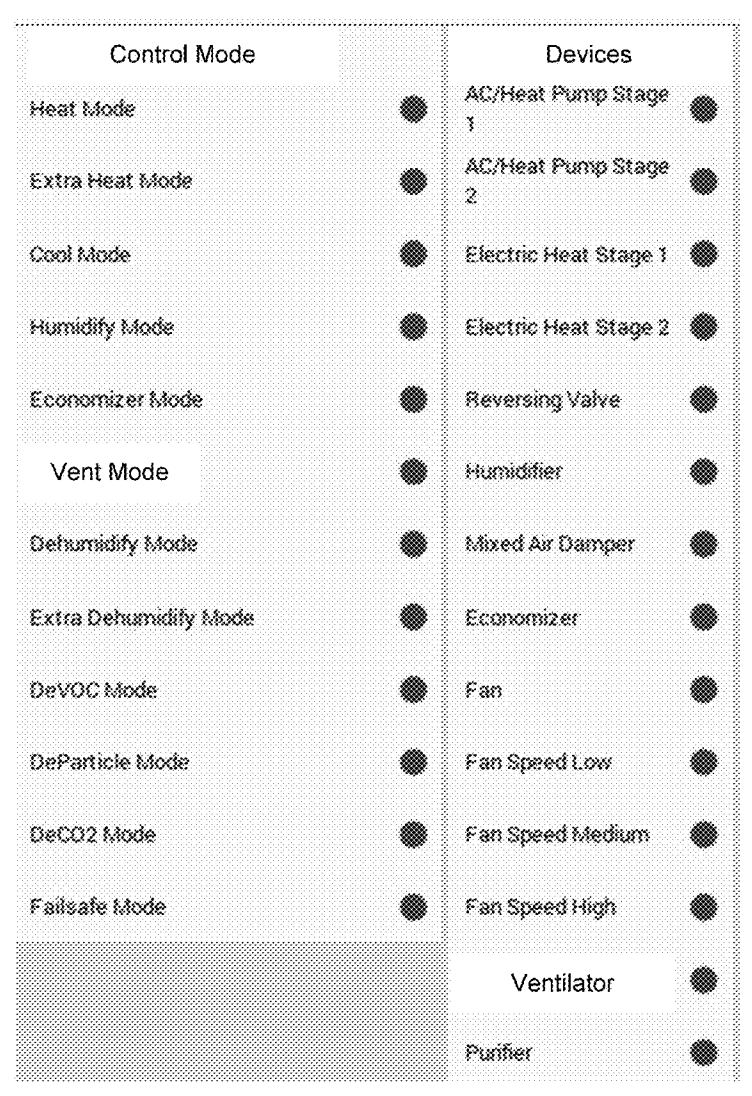

FIG. 8 includes an example user interface displayed by the customer device 524 during execution of the application based on additional data indicative of present statuses of control modes and present (operation) statuses of various devices and modes of devices of the building. The present statuses may be, for example, on or off. The present status of a control mode, device, or mode of a device may be on (currently in use) or off (not currently in use). One type of indicator may be used to indicate a present status of on, while another type of indicator may be used to indicate a present status of off. The customer device 524 may display the additional data concurrently with the data from one or more IAQ modules, the local data, and/or the setpoint data.

The customer device 524 selectively displays measurements of one or more IAQ sensor modules, local data, control modes, and/or statuses from a predetermined period of time. The predetermined period of time may be, for example, the present day, a predetermined number of days (including or not including the present day), a predetermined number of hours before a present time, a predetermined number of minutes before the present time, or another suitable period. By default, a predetermined period may be selected (e.g., the present day), but a user may select a different predetermined period and the customer device 524 may display the data for the selected predetermined period.

Figure 9:
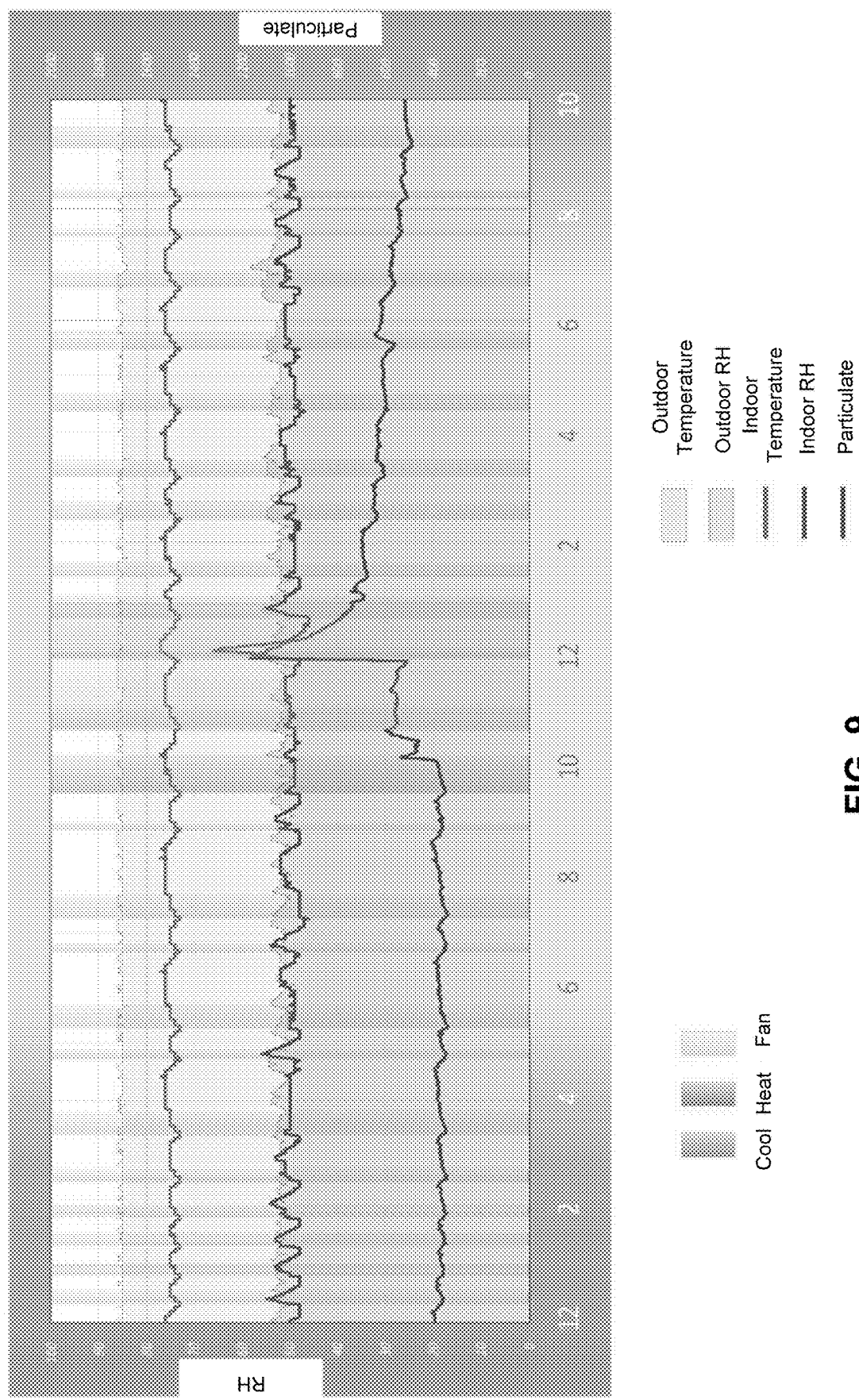

FIG. 9 includes an example user interface displayed by the customer device 524 during execution of the application for the present day (from 12:01 pm of the present day to the present time (approximately 10 pm in this example)). The customer device 524 displays data selected by a user of the customer device 524. By default, all data may be selected, but a user may select less than all of the data to be displayed, and the customer device 524 may display only the selected data.

For example, in FIG. 9, only outdoor temperature (from the local data), outdoor RH (from the local data), indoor temperature (from the IAQ sensor module 304), indoor RH (from the IAQ sensor module 304), and particulate (from the IAQ sensor module 304) are graphed over time. Indicators of the statuses of the cooling mode, the heating mode, and use of the circulator blower 108 are also concurrently shown over time. Indoor Carbon dioxide (from the IAQ sensor module 304, if measured) and indoor VOCs (from the IAQ sensor module 304, if measures) are not graphed over time in this example.

The customer device 524 selectively displays a user interface for user selection of a priority for mitigating deviations in IAQ parameters. For example, the customer device 524 may display a user interface that allows user assignment of an order of prioritization for: (i) temperature control: (ii) RH control; (iii) particulate control; (vi) VOC control; and (v) carbon dioxide control. Temperature control may refer to maintaining, as much as possible, the temperature within the building within a predetermined temperature range. RH control may refer to maintaining, as much as possible, the RH within the building within a predetermined temperature range. Particulate control may refer to maintaining, as much as possible, the amount of particulate within the building less than a predetermined amount of particulate. VOC control may refer to maintaining, as much as possible, the amount of VOCs within the building less than a predetermined amount of VOCs. Carbon dioxide control may refer to maintaining, as much as possible, the amount of carbon dioxide within the building less than a predetermined amount of carbon dioxide. The order of prioritization for (i)-(v) may be initially preset, but may be user selected, as stated above.

The thermostat 208 and/or the IAQ control module 404 may control the mitigation devices 424 based on the prioritization (order). For example, when particulate control is the first priority, the thermostat 208 may control the mitigation devices 424 to decrease particulate as quickly as possible as opposed to, for example, controlling the mitigation devices 424 to more quickly adjust temperature or RH or to more quickly decrease the amount of VOCs and/or the amount of carbon dioxide.

The user interfaces provided by the customer device 524 provide visual information to the user regarding real-time measurements, historical measurements over a period of time, trends, and efficacy of IAQ mitigation and control. The user interfaces also enable the user to adjust setpoints to be used to control the mitigation devices 424 to control comfort and IAQ within the building. The user interfaces also enable the user to adjust prioritization in which IAQ conditions are mitigated. All of the above improves IAQ within the building and user experience regarding IAQ within the building.

Figure 10:
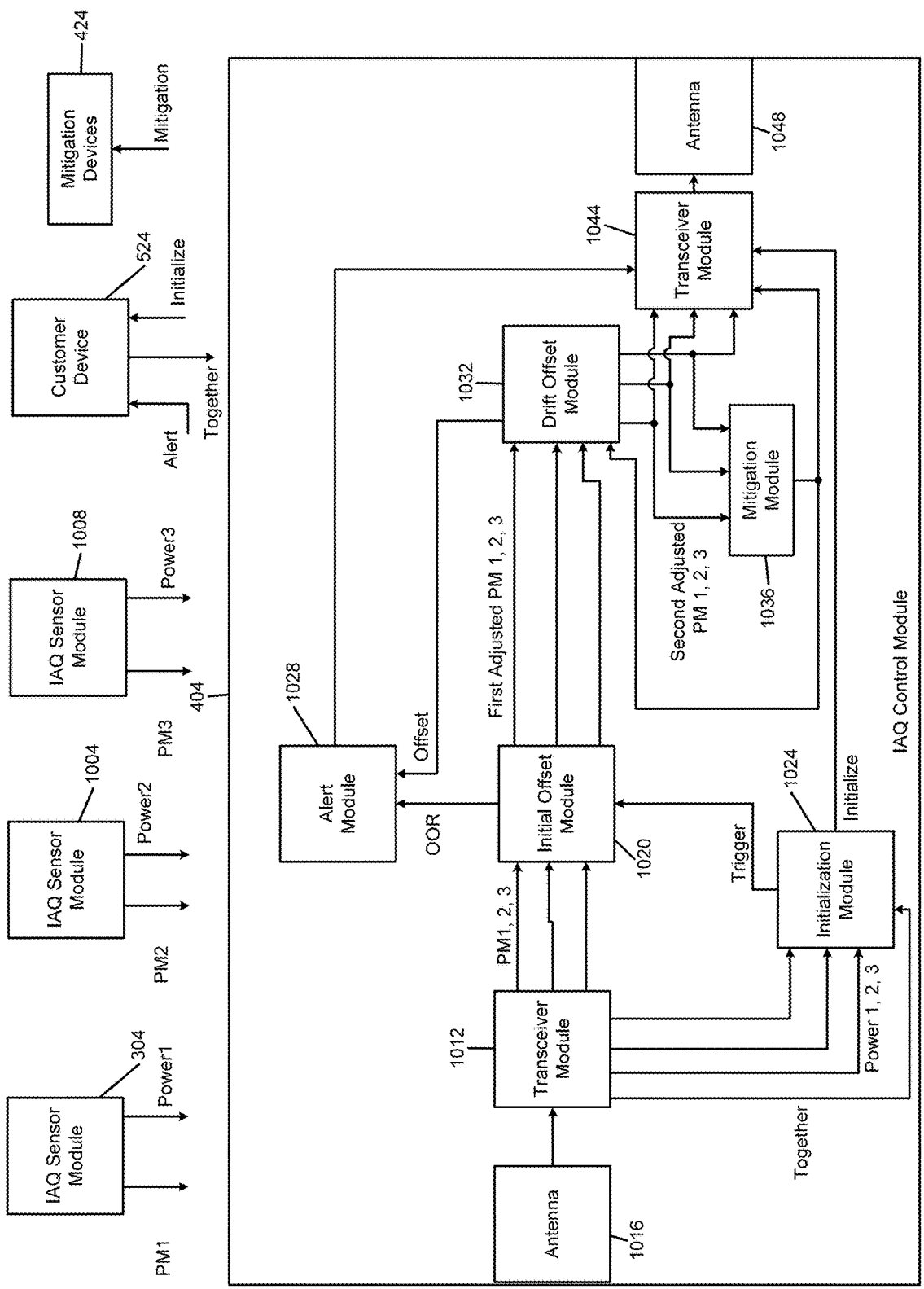
FIG. 10 includes a functional block diagram of an example IAQ monitoring and control system.

FIG. 10 includes a block diagram of an example implementation of an IAQ monitoring and control system using the example of the IAQ control module 404 and multiple IAQ sensor modules. Specifically, FIG. 10 includes the IAQ control module 404, the IAQ sensor module 304, a second IAQ sensor module 1004, and a third IAQ sensor module 1008. The above description of the IAQ sensor module 304 is also applicable to the second and third IAQ sensor modules 1004 and 1008. The second and third IAQ sensor modules 1004 and 1008 may be the same as the IAQ sensor module 304 and include one, more than one, or all of the sensors described above with respect to the IAQ sensor module 304. While the example of three IAQ sensor modules is provided, the present disclosure is applicable to two IAQ sensor modules, more than three IAQ sensor modules, and only the IAQ sensor module 304. Statistically speaking, the average may become more accurate as the number of IAQ sensor modules increases.

A transceiver module 1012 receives the IAQ parameters from the IAQ sensor module 304, the second IAQ sensor module 1004, and the third IAQ sensor module 1008 ("the IAQ sensor modules") wirelessly or by wire. The transceiver module 1012 may also receive on/off statuses of the IAQ sensor modules (Power 1, Power 2, Power 3) that indicates whether that one of the IAQ sensor modules is (powered) on or off. The transceiver module 1012 may receive the data from the IAQ sensor modules wirelessly via one or more antennas, such as antenna 1016, using a proprietary or standardized, wired or wireless protocol, such as Bluetooth, ZigBee (IEEE 802.15.4), 900 Megahertz, 2.4 Gigahertz, WiFi (IEEE 802.11).

When the IAQ sensor modules are used within the (same) building, a user may lose trust in accuracy of the IAQ sensor modules and/or the IAQ system when the measurements of (the same type of sensor of) the IAQ sensor modules are different or differ by a large amount. An initial offset module 1020 determines initial offsets for the measurements of sensors of the IAQ sensor modules. For example, the initial offset module 1020 may determine the initial offsets once during installation/setup of the IAQ sensor modules with the IAQ control module 404 and the determined initial offsets may be used thereafter.

An initialization module 1024 may trigger the initial offset module 1020 to determine the initial offsets, for example, in response to the IAQ control module 404 establishing wireless connections (e.g., pairing, wireless connection, etc.) with the IAQ sensor modules after the IAQ sensor modules are first powered on. For example, when the IAQ control module 404 establishes wireless connections with the IAQ sensor modules, the initialization module 1024 may transmit a signal (initialize) to the customer device 524 to instruct the user to locate each of the IAQ sensor modules within a predetermined distance (e.g., 1 foot) of each other and within the same room of the building. The IAQ sensors of each of the IAQ sensor modules should measure approximately the same measurements when positioned within the predetermined distance of each other and within the same room of the building.

In response to the signal, the customer device 524 may display a predetermined user interface on the display of the customer device 524 that instructs the user to locate each of the IAQ sensor modules within the predetermined distance of each other and within the same room of the building. In various implementations, the IAQ sensor modules may be provided with physical (e.g., printed) instructions to locate each of the IAQ sensor modules within the predetermined distance of each other and within the same room of the building when the IAQ sensor modules are first powered on.

In various implementations, the customer device 524 may transmit a signal (together) to the IAQ control module 404 indicative of user input that each of the IAQ sensor modules is within the predetermined distance of each other and within the same room of the building. The initialization module 1024 may trigger the initial offset module 1020 to determine the initial offsets in response to receipt of the signal from the customer device 524 indicative of the receipt of user input that each of the IAQ sensor modules is within the predetermined distance of each other and within the same room of the building. The customer device 524 may transmit the signal, for example, in response to user input to the predetermined user interface or in response to another user input to the customer device 524. Alternatively, the initialization module 1024 may trigger the initial offset module 1020 to determine the initial offsets in response to the powering on or wireless connection of two or more IAQ sensor modules within a predetermined period of each other.

Once determined, the initial offsets may not again be updated. Alternatively, the initialization module 1024 may trigger re-determination of the initial offsets periodically and/or when one or more IAQ sensor modules are added or removed from the IAQ system.

Figure 11:
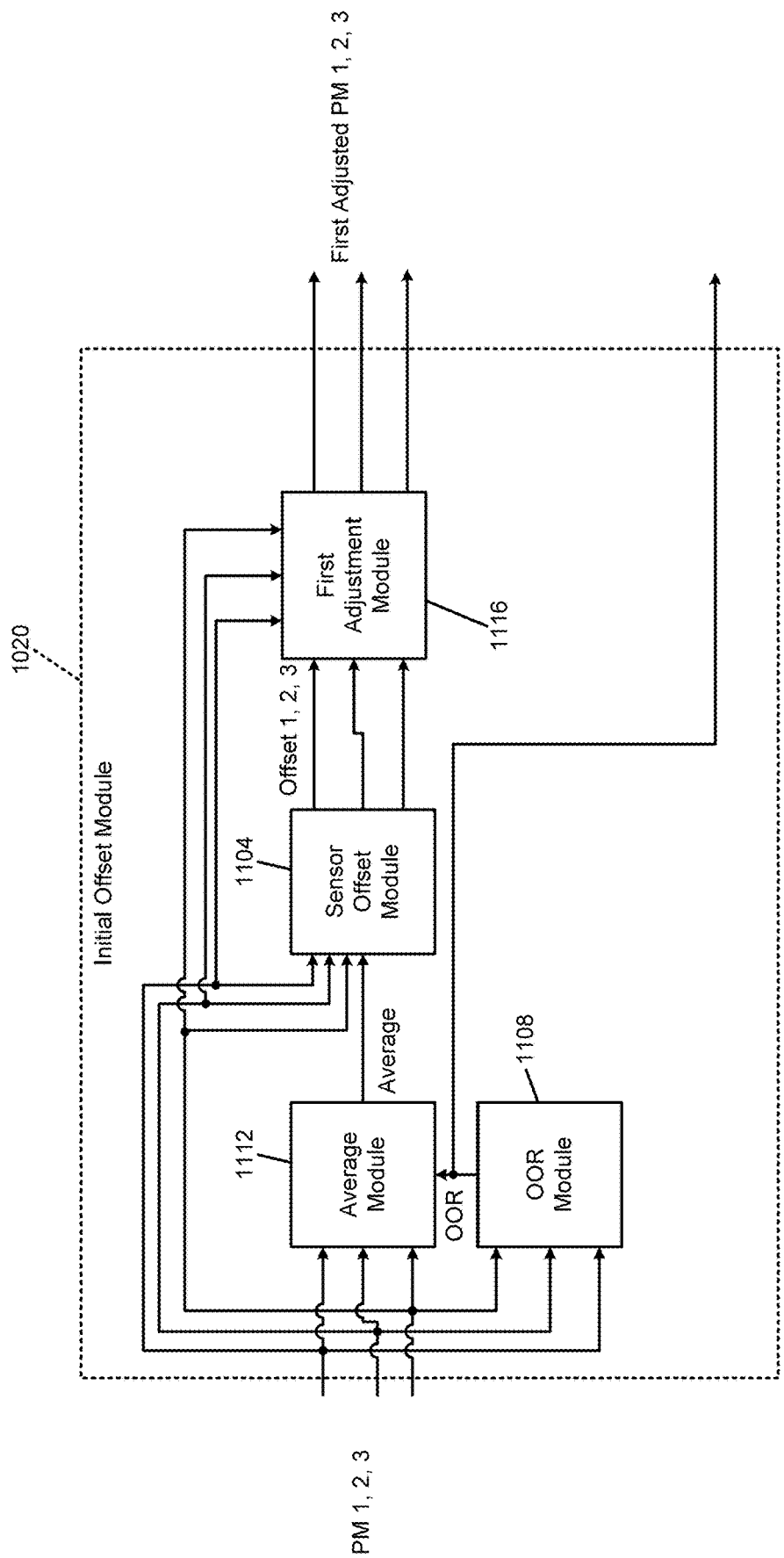
FIG. 11 includes a functional block diagram of an example implementation of an initial offset module.
Figure 12:
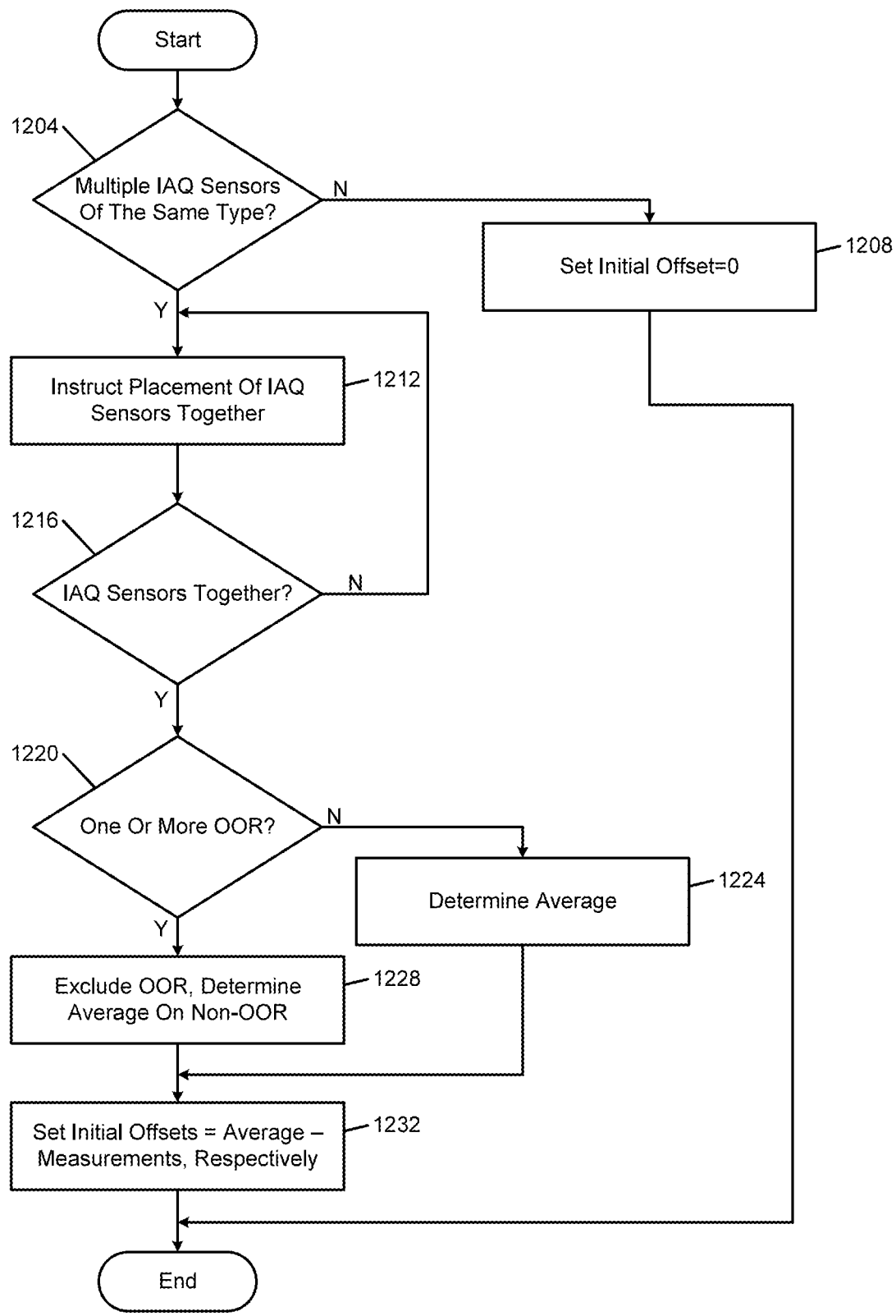
FIG. 12 includes a flowchart depicting an example method of determining initial offsets for particulate sensors of IAQ sensor modules.

FIG. 11 is a functional block diagram of an example implementation of the initial offset module 1020. FIG. 12 includes a flowchart depicting an example method of determining the initial offsets for particulate sensors of the IAQ sensor modules (the IAQ sensor module 304, the second IAQ sensor module 1004, and the third IAQ sensor module 1008). While the example of particulate sensors of the IAQ sensor modules is provided, the following may be performed for each type of IAQ sensor (VOCs, carbon dioxide, particulate, temperature, and RH).

FIGS. 11 and 12 will now be described together. In the following, reference numerals in the 1100s are shown in FIG. 11 and reference numerals in the 1200s are shown in FIG. 12.

Control may begin with 1204 where the initialization module 1024 determines whether two or more IAQ sensor modules having the same type of IAQ sensor are connected to the IAQ control module 404, such as wirelessly. If 1204 is false, a sensor offset module 1104 may set the initial offset for the particulate sensor for that one IAQ sensor module to zero at 1208 (FIG. 12) and control may end. If 1204 is true, control may continue with 1212.

At 1212, the initialization module 1024 may transmit the signal to the customer device 524 to instruct the user to locate each of the IAQ sensor modules within the predetermined distance of each other and within the same room of the building. The customer device 524 may display the predetermined user interface in response to receipt of the signal.

At 1216, the initialization module 1024 may determine whether the signal has been received from the customer device 524 indicative of user input that each of the IAQ sensor modules is within the predetermined distance of each other and within the same room of the building. If 1216 is false, control may return to 1212. If 1216 is true, control may continue with 1220. In various implementations, 1212 and 1216 may be omitted.

At 1220, an out of range (OOR) module 1108 may determine whether one or more of the amounts of particulate measured by the particulate sensors of the IAQ modules are outside of a predetermined range. The predetermined range may be calibrated and may be set to limits of measurements of the particulate sensors. The upper limit of the predetermined range is greater than the first predetermined amount of particulate and may be set to, for example, 30 µg per cubic meter or another suitable value. The lower limit of the predetermined range is less than the second predetermined amount of particulate and may be set to, for example, 3 µg per cubic meter or another suitable value. The OOR module 1108 generates an OOR signal that indicates which, if any, of the particulate sensors provided one or more measurements that are greater than the upper limit of the predetermined range or less than the lower limit of the predetermined range. The OOR module 1108 also determines whether measurements of other types of sensors are out of respective predetermined ranges. If 1220 is false, control continues with 1224. If 1220 is true, control continues with 1228.

At 1224, none of the particulate sensors provided a measurement of particulate that is greater than the upper limit of the predetermined range or less than the lower limit of the predetermined range. An average module 1112 determines an average of the amounts of particulate measured by the particulate sensors of the IAQ sensor modules. For example, the average module 1112 determines an average of the amount of particulate (PM 1) measured by the particulate sensor of the IAQ sensor module 304, the amount of particulate (PM 2) measured by the particulate sensor of the second IAQ sensor module 1004, and the amount of particulate (PM 3) measured by the particulate sensor of the third IAQ sensor module 1008. The average may be, for example, a non-weighted average. In the example of the three IAQ sensor modules each having a particulate sensor, the average module 1112 may, for example, set the average based on or equal to $$\frac{PM1 + PM2 + PM3}{3}$$

where PM 1 is the amount of particulate measured by the particulate sensor of the IAQ sensor module 304, PM 2 is the amount of particulate measured by the particulate sensor of the second IAQ sensor module 1004, and PM 3 is the amount of particulate measured by the particulate sensor of the third IAQ sensor module 1008. The example is for a system using three sensor modules, however, any number of sensor modules can be used with the average calculation adjusted accordingly. Control continues with 1232, which is discussed further below.

At 1228, one or more of the particulate sensors provided a measurement of particulate that is greater than the upper limit of the predetermined range or less than the lower limit of the predetermined range. The average module 1112 excludes the one or more of the particulate sensors that provided such a measurement from the determination of the average. For example, if the amount of particulate (PM 1) measured by the particulate sensor of the IAQ sensor module 304 is out of range, the average module 1112 may, for example, set the average based on or equal to $$\frac{PM2 + PM3}{2}$$

where PM 2 is the amount of particulate measured by the particulate sensor of the second IAQ sensor module 1004, and PM 3 is the amount of particulate measured by the particulate sensor of the third IAQ sensor module 1008. Control continues with 1232.

At 1232, the sensor offset module 1104 determines the initial offsets for the particulate sensors, respectively. The sensor offset module 1104 determines the initial offset for one of the particulate sensors of one of the IAQ sensor modules based on a difference between the amount of particulate measured by that one of the particulate sensors and the average.

For example, the sensor offset module 1104 may set the initial offset (initial offset 1) for the particulate sensor of the IAQ sensor module 304 based on or equal to the average minus the amount of particulate measured by the particulate sensor of the IAQ sensor module 304. The sensor offset module 1104 may set the initial offset (initial offset 2) for the particulate sensor of the second IAQ sensor module 1004 based on or equal to a difference between the average and the amount of particulate measured by the particulate sensor (e.g., the average minus the amount of particulate measured by the particulate sensor) of the second IAQ sensor module 1004. The sensor offset module 1104 may set the initial offset (initial offset 3) for the particulate sensor of the third IAQ sensor module 1008 based on or equal to the average minus the amount of particulate measured by the particulate sensor of the third IAQ sensor module 1008.

As described above, while the example of particulate sensors of the IAQ sensor modules is provided, initial offsets may be performed for each type of IAQ sensor (VOCs, carbon dioxide, particulate, temperature, and RH). For example, initial offsets for VOC sensors of the IAQ sensor modules may be determined the same way (but based on the amounts of VOCs measured by the respective VOC sensors). Initial offsets for carbon dioxide sensors of the IAQ sensor modules may be determined the same way (but based on the amounts of carbon dioxide measured by the respective carbon dioxide sensors). Initial offsets for temperature sensors of the IAQ sensor modules may be determined the same way (but based on the temperatures measured by the respective temperature sensors). Initial offsets for RH sensors of the IAQ sensor modules may be determined the same way (but based on the RHs measured by the respective RH sensors).

Referring to FIG. 11, a first adjustment module 1116 determines first adjusted amounts of particulate based on the amounts of particulate measured by the particulate sensors and the initial offsets of the particulate sensors, respectively. The first adjustment module 1116 determines the first adjusted amount of particulate for one of the particulate sensors of one of the IAQ sensor modules based on the initial offset of that one of the particulate sensors and the measurements of that one of the particulate sensors.

For example, the first adjustment module 1116 may set the first adjusted amount of particulate (first adjusted PM 1) for the particulate sensor of the IAQ sensor module 304 based on or equal to the measured amount of particulate plus the initial offset (initial offset 1) determined for the particulate sensor of the IAQ sensor module 304. The first adjustment module 1116 may set the first adjusted amount of particulate (first adjusted PM 2) for the particulate sensor of the second IAQ sensor module 1004 based on or equal to the measured amount of particulate plus the initial offset (initial offset 2) determined for the particulate sensor of the second IAQ sensor module 1004. The first adjustment module 1116 may set the first adjusted amount of particulate (first adjusted PM 3) for the particulate sensor of the third IAQ sensor module 1008 based on or equal to the measured amount of particulate plus the initial offset (initial offset 3) determined for the particulate sensor of the third IAQ sensor module 1008.

The first adjustment module 1116 does the same for the other types of IAQ sensors (sums the initial offsets with the measurements) to determine first adjusted measurements of those sensors. The first adjustment module 1116 may do this for each measurement of each sensor over time. The adjustment of the measurements based on the initial offsets normalizes the measurements. This may help avoid the possibility of the user losing trust in the accuracy of the sensors and/or the IAQ system.

Referring back to FIG. 10, an alert module 1028 may receive the OOR signal from the OOR module. The alert module 1028 may transmit an alert to customer device 524 and/or a contractor device when one or more sensors provide a measurement that is greater than the upper limit of the respective predetermined range or less than the lower limit of the respective predetermined range. In response to the alert, the customer device 524 and/or the contractor device may display a predetermined alert message on the display indicating a possible fault in the one or more sensors that are providing measurements that are outside of the respective predetermined range.

The measurements of one or more of the IAQ sensors of an IAQ sensor module may naturally drift over time. For example, the amount of particulate measured by the particulate sensor 316 of the IAQ sensor module 304 may increase over time as particulate accumulates within the particulate sensor 316. The amount of VOCs measured by the VOC sensor 320 of the IAQ sensor module 304 may increase over time as a sensing element of the VOC sensor 320 becomes saturated with VOCs. The amount of carbon dioxide measured by the carbon dioxide sensor 324 of the IAQ sensor module 304 may increase over time as a sensing element of the carbon dioxide sensor 324 becomes saturated with carbon dioxide. If the drift of a sensor is unaccounted for, mitigation may be started more frequently and/or a user may lose trust in measurements.

A drift offset module 1032 determines drift offsets for the measurements of IAQ sensors, respectively, of the IAQ sensor modules. The drift offset module 1032 adjusts the first adjusted measurements based on respective drift offsets to determine second adjusted measurements, respectively. Because the respective drift offsets are determined to offset drift in the respective measurements, the second adjusted measurements may not increase (or otherwise drift) over time.

Figure 13:
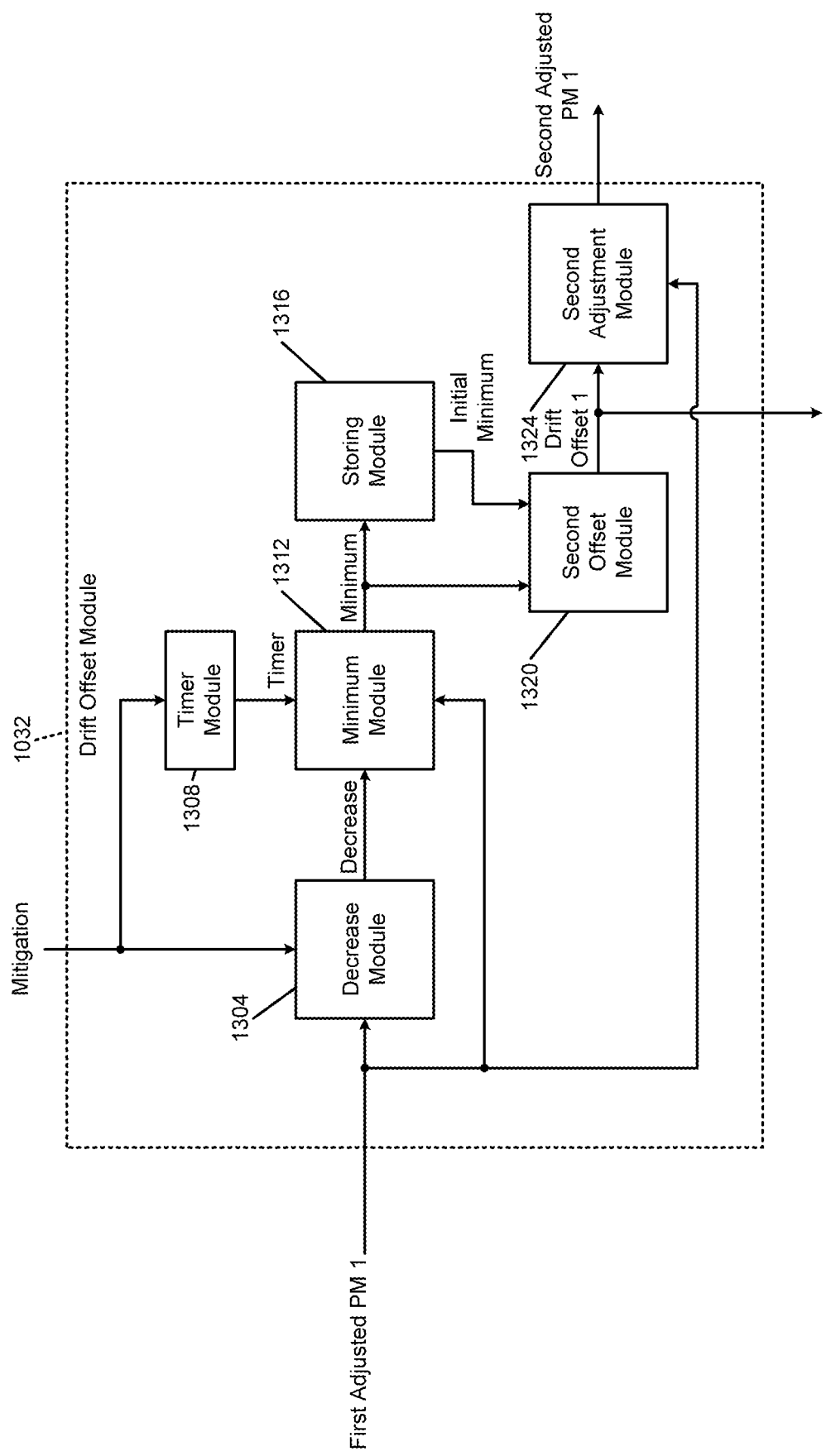
FIG. 13 includes a functional block diagram of an example implementation of a drift offset module.
Figure 14:
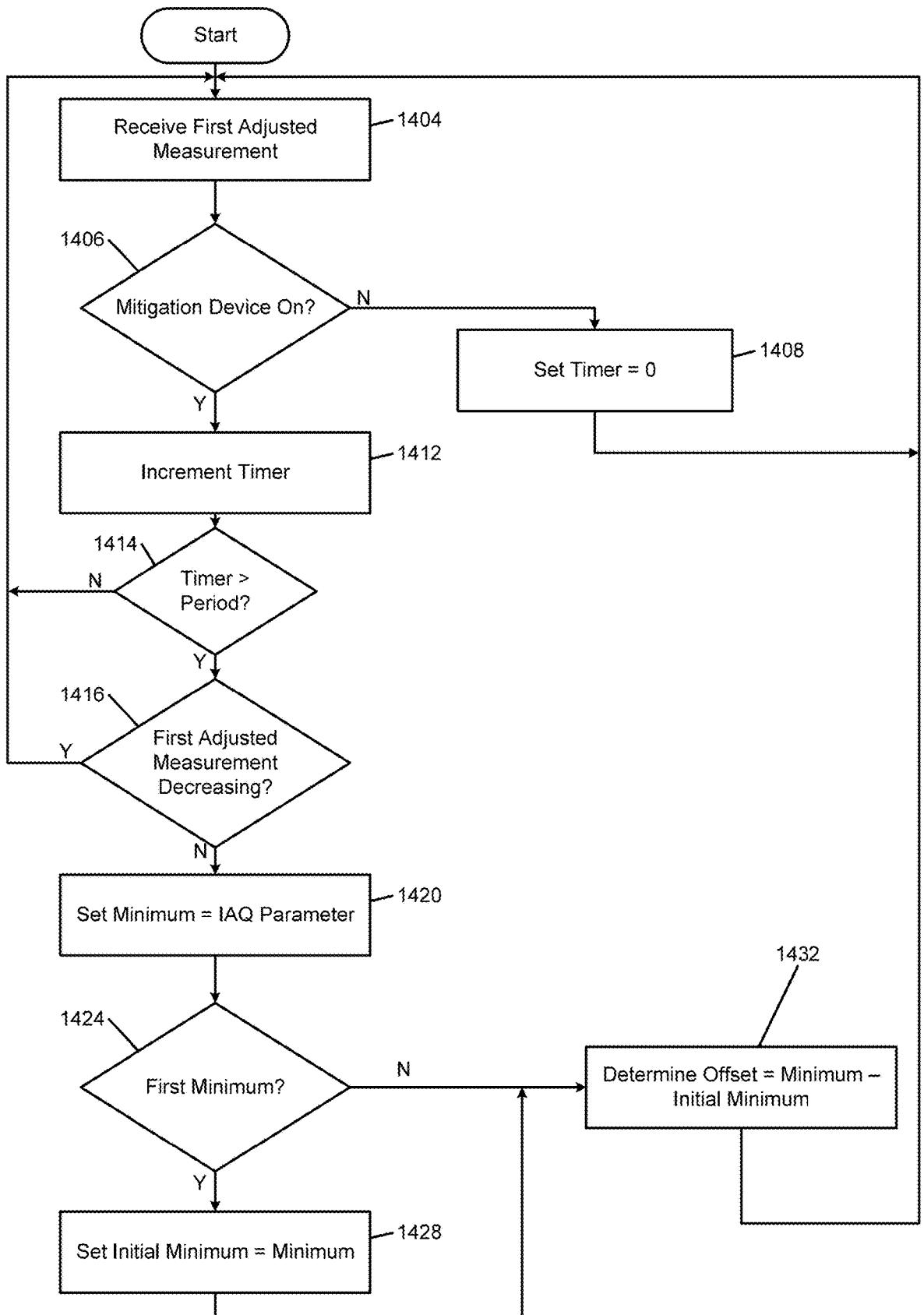
FIG. 14 includes a flowchart depicting an example method of determining drift offsets for particulate sensors of the IAQ sensor modules.

FIG. 13 is a functional block diagram of an example implementation of the drift offset module 1032. FIG. 14 includes a flowchart depicting an example method of determining the drift offsets for the particulate sensor of an IAQ sensor module (the IAQ sensor module 304, the second IAQ sensor module 1004, or the third IAQ sensor module 1008). While the example of a particulate sensor of an IAQ sensor module is provided, the following may be performed for each type of IAQ sensor (VOCs, carbon dioxide, particulate, temperature, and RH) of each IAQ sensor module.

FIGS. 13 and 14 will now be described together. In the following, reference numerals in the 1300s are shown in FIG. 13 and reference numerals in the 1400s are shown in FIG. 14.

Control may begin with 1404 where a decrease module 1304 receives a first adjusted measurement, such as the first adjusted amount of particulate of the particulate sensor 316 of the IAQ sensor module 304. At 1406, a timer module 1308 determines whether a mitigation device associated with the first adjusted measurement is on. That mitigation device is turned on to decrease the first adjusted measurement. For example, in the example of the first adjusted amount of particulate, the timer module 1308 may determine whether at least one of the air cleaner/purifier 428 and the air handler unit 136 is on. The air cleaner/purifier 428 and the air handler unit 136 may be turned on to decrease the amount of particulate in the air within the building. In the example of the first adjusted amount of VOCs or the first adjusted amount of carbon dioxide, the timer module 1308 may determine whether the ventilator 440 is on. The ventilator 440 may be turned on to decrease the amount of VOCs and/or the amount of carbon dioxide in the air within the building. If 1406 is false, the timer module 1308 resets a timer value to zero at 1408, and control returns to 1404. If 1406 is true, control continues with 1412.

At 1412, the timer module 1308 increments the timer value (e.g., sets the timer value=timer value+1). In this manner, the timer value tracks the period elapsed (continuously) since the mitigation device associated with the first adjusted measurement was last turned on.

At 1414, a minimum module 1312 determines whether the timer value is greater than a predetermined period. The predetermined period may be calibratable and may be set to a period long enough to allow a decrease in the IAQ parameter to its minimum value. If 1414 is true, control may continue with 1416. If 1414 is false, control may return to 1404.

At 1416, the decrease module 1304 determines a decrease in the first adjusted measurement since a last instance of the first adjusted measurement, and the minimum module 1312 determines whether the first adjusted measurement is decreasing. For example, the decrease module 1304 determines the decrease based on the first adjusted measurement (from 1404) minus the last instance of the first adjusted measurement (e.g., from the last instance of 1404). The minimum module 1312 may determine that the first adjusted measurement is decreasing when the decrease is a negative value (i.e., the first adjusted measurement from 1404 is less than the first adjusted measurement from the last instance of 1404).

When the minimum module 1312 determines that the first adjusted measurement is no longer decreasing (i.e., when 1416 is false), the minimum module 1312 stores the first adjusted measurement as a minimum value (minimum) at 1420. In other words, the minimum module 1312 sets the minimum value equal to the first adjusted measurement at 1420. When the minimum module 1312 determines that the first adjusted measurement is decreasing (i.e., 1416 is true), the minimum module 1312 may not store the minimum value, and control may return to 1404. In various implementations, 1416 may be omitted, and control may continue with 1420 when 1414 is true.

At 1424, a storing module 1316 determines whether the minimum has been previously stored since the installation/setup of the IAQ sensor module 304 with the IAQ control module 404. In other words, the storing module 1316 determines whether this is the first complete mitigation cycle after the installation/setup of the IAQ sensor module 304. If 1424 is true, the storing module 1316 sets an initial minimum value (initial minimum) to the minimum value at 1428, and control continues with 1432. If 1424 is false, the storing module 1316 maintains the initial minimum value (i.e., does not store the minimum value as the initial minimum value, and control continues with 1432.

At 1432, a second offset module 1320 determines the drift offset for the particulate sensor 316. The second offset module 1320 determines the drift offset for the particulate sensor 316 based on a difference between the minimum value and the initial minimum value. For example, the second offset module 1320 may set the drift offset for the particulate sensor 316 of the IAQ sensor module 304 based on or equal to the minimum value minus the initial minimum value. The drift offset therefore accounts for the increase (drift) in the minimum value that may occur over time.

As described above, while the example of particulate sensor of the IAQ sensor module is provided, a drift offset may be determined for each particulate sensor of each IAQ sensor module, and a drift offset may be determined for each other type of IAQ sensor (VOCs, carbon dioxide, temperature, and RH) of each IAQ sensor module. For example, drift offsets for VOC sensors may be determined the same way (but based on the initial minimum values and minimum values of VOCs measured by the respective VOC sensors). Drift offsets for carbon dioxide sensors may be determined the same way (but based on the initial minimum values and minimum values of carbon dioxide measured by the respective carbon dioxide sensors).

Referring to FIG. 13, a second adjustment module 1324 determines second adjusted measurements based on the first adjusted and the drift offsets of the IAQ sensors, respectively. For example, the second adjustment module 1324 determines second adjusted amounts of particulate based on the first adjusted amounts of particulate of the particulate sensors and the drift offsets of the particulate sensors, respectively. The second adjustment module 1324 determines the second adjusted amount of particulate for one of the particulate sensors based on the drift offset of that one of the particulate sensors and the first adjusted amount of particulate measured using that one of the particulate sensors.

For example, the second adjustment module 1324 may set the second adjusted amount of particulate (second adjusted PM 1) for the particulate sensor 316 of the IAQ sensor module 304 based on or equal to the first adjusted amount of particulate plus the drift offset (drift offset 1) determined for the particulate sensor 316 of the IAQ sensor module 304. The second adjustment module 1324 may set the second adjusted amount of particulate (second adjusted PM 2) for the particulate sensor of the second IAQ sensor module 1004 based on or equal to the first adjusted amount of particulate for the particulate sensor of the second IAQ sensor module 1004 plus the drift offset (initial offset 2) determined for the particulate sensor of the second IAQ sensor module 1004. The second adjustment module 1324 may set the second adjusted amount of particulate (second adjusted PM 3) for the particulate sensor of the third IAQ sensor module 1008 based on or equal to the first amount of particulate for the particulate sensor of the third IAQ sensor module 1008 plus the drift offset (initial offset 3) determined for the particulate sensor of the third IAQ sensor module 1008.

The second adjustment module 1324 does the same for the other types of IAQ sensors (sums the drift offsets with the first adjusted measurements) to determine second adjusted measurements of the respective IAQ sensors. The adjustment of the measurements based on the drift offsets adjusts the measurements for drifting of the sensors, for example, due to accumulation/logging of particulate (e.g., in the example of particulate sensors) or saturation of a sensing element (e.g., in the example of VOC and carbon dioxide sensors). This may help avoid the possibility of the user losing trust in the accuracy of the sensors and/or the operation of the IAQ system. As one example, if drift of a sensor is not accounted for, mitigation may be started prematurely (before the measurement is actually greater than the respective predetermined value).

Figure 18A:
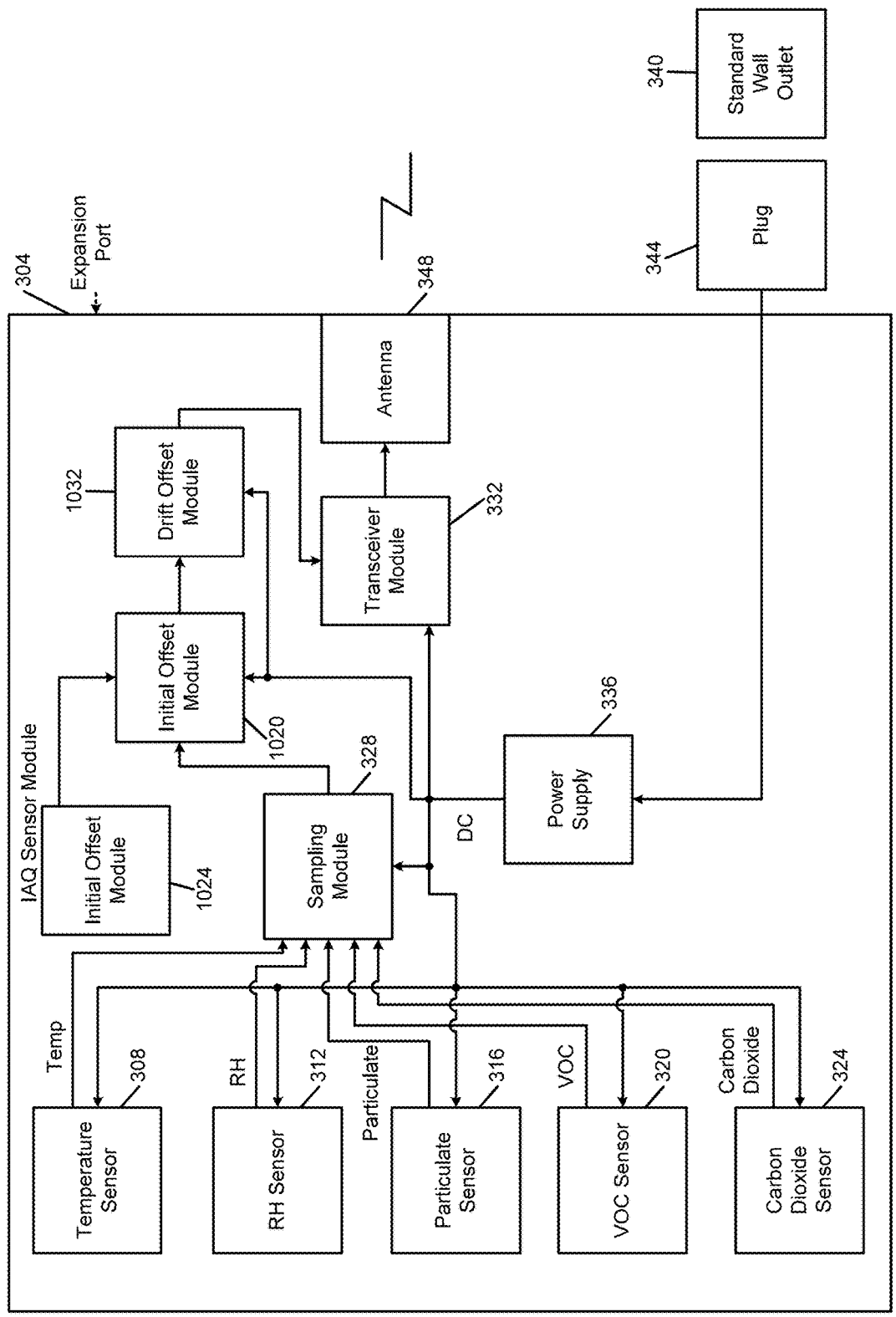
FIGS. 18A-18B include functional block diagrams including example IAQ sensor modules.
Figure 18B:
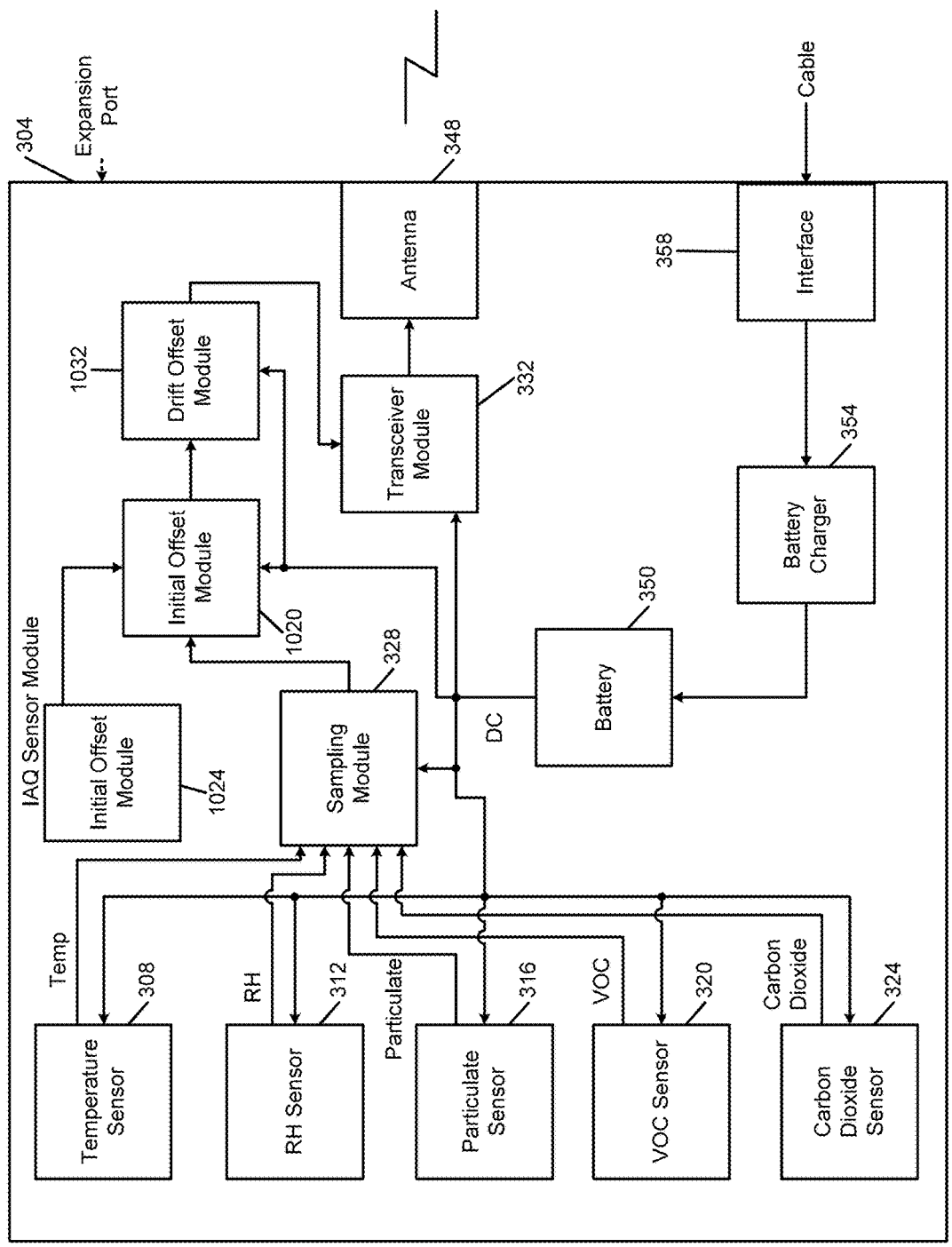

In various implementations, the initial offset module 1020 may be omitted and the drift offset module 1032 may be included. In various implementations, the initial offset module 1020 may be included and the drift offset module 1032 may be omitted. While the example of the IAQ control module 404 is provided for purposes of discussion, one or more modules of the IAQ control module 404 may be implemented elsewhere. For example, the initialization module 1024, the initial offset module 1020, and the drift offset module 1032 may be implemented within each IAQ sensor module such that the measurements of each IAQ sensor module are adjusted prior to transmission from that IAQ sensor module. FIGS. 18A and 18B include functional block diagrams of such examples of the initial offset module 1020 and the drift offset module 1032 being implemented within the IAQ sensor module 304.

Figure 15:
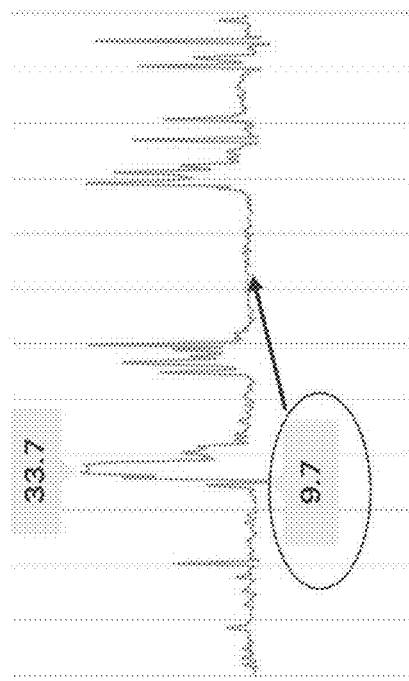
FIG. 15 includes example graphs of particulate measured by a particulate sensor during two different periods.
Figure 15:
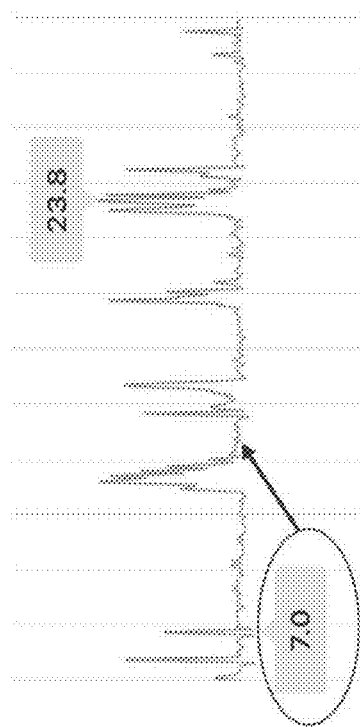

FIG. 15 includes example graphs of particulate measured by a particulate sensor during two different periods. The left graph was measured approximately one month before the measurements of the right graph. As shown by the right graph, more particulate had become logged in the particulate sensor. The minimum of the right graph was therefore higher than the minimum of the left graph. The drift offset discussed above would remedy this change such that the measurements of the particulate sensor as provided to the user would remain approximately the same, despite the particulate sensor being logged with more particulate.

Referring back to FIG. 10, the alert module 1028 may receive the drift offsets of the IAQ sensors, respectively. The alert module 1028 may transmit an alert to the customer device 524 and/or a contractor device when one or more of the drift offsets are greater than a predetermined value. For example, the alert module 1028 may transmit an alert to the customer device 524 and/or the contractor device when a drift offset is greater than a predetermined percentage (or fraction) of a range of values defined by the predetermined maximum value of that parameter (where mitigation is started) and the initial minimum value. In response to the alert, the customer device 524 and/or the contractor device may display a predetermined alert message on the display indicating a possible fault in the one or more IAQ sensors and/or an instruction to clean the one or more IAQ sensors.

A mitigation module 1036 controls operation of the mitigation devices 424 based on the second adjusted parameters (or the first adjusted parameters in the example where adjustment based on the drift offset is omitted). For example, the mitigation module 1036 may turn on heating of the building when a second adjusted temperature is less than the lower limit of the predetermined range for heating. The mitigation module 1036 may turn on cooling when the second adjusted temperature is greater than the upper limit of the predetermined range for cooling. The mitigation module 1036 may turn on the air cleaner/purifier 428 when a second adjusted amount of particulate is greater than a first predetermined amount of particulate. The mitigation module 1036 may leave the air cleaner/purifier 428 on until the second adjusted amount of particulate is less than a second predetermined amount of particulate that is less than the first predetermined amount of particulate. The mitigation module 1036 may turn the air cleaner/purifier 428 off when the second adjusted amount of particulate is less than the second predetermined amount of particulate. In various implementations, the mitigation module 1036 may vary the speed of the air cleaner/purifier 428 based on the second adjusted amount of particulate. For example, the mitigation module 1036 may increase the speed of the air cleaner/purifier 428 as the second adjusted amount of particulate increases and vice versa.

The mitigation module 1036 may turn the humidifier 432 on when a second adjusted RH is less than the first predetermined RH. The mitigation module 1036 may leave the humidifier 432 on until the second adjusted RH is greater than the second predetermined RH that is greater than the first predetermined RH. The mitigation module 1036 may turn the humidifier 432 off when the second adjusted RH is greater than the second predetermined RH.

The mitigation module 1036 may turn the dehumidifier 436 on when the second adjusted RH is greater than the third predetermined RH. The mitigation module 1036 may leave the dehumidifier 436 on until the second adjusted RH is less than the fourth predetermined RH that is less than the third predetermined RH. The mitigation module 1036 may turn the dehumidifier 436 off when the second adjusted RH is less than the fourth predetermined RH.

The mitigation module 1036 may turn the ventilator 440 on when a second adjusted amount of VOCs is greater than the first predetermined amount of VOCs. The mitigation module 1036 may leave the ventilator 440 on until the second adjusted amount of VOCs is less than the second predetermined amount of VOCs that is less than the first predetermined amount of VOCs. The mitigation module 1036 may turn the ventilator 440 off when the second adjusted amount of VOCs is less than the second predetermined amount of VOCs.

The mitigation module 1036 may turn the ventilator 440 on when a second adjusted amount of carbon dioxide is greater than the first predetermined amount of carbon dioxide. The mitigation module 1036 may leave the ventilator 440 on until the second adjusted amount of carbon dioxide is less than the second predetermined amount of carbon dioxide that is less than the first predetermined amount of carbon dioxide. The mitigation module 1036 may turn the ventilator 440 off when the second adjusted amount of carbon dioxide is less than the second predetermined amount of carbon dioxide.

A transceiver module 1044 may transmit the second adjusted IAQ parameters to the customer device 524. The customer device 524 may display the second adjusted IAQ parameters on a display of the customer device 524 or the thermostat 208. The transceiver module 1044 may transmit parameters via one or more parameters, such as the antenna 1048, using a proprietary or standardized, wired or wireless protocol, such as Bluetooth, ZigBee (IEEE 802.15.4), 900 Megahertz, 2.4 Gigahertz, WiFi (IEEE 802.11).

Figure 16:
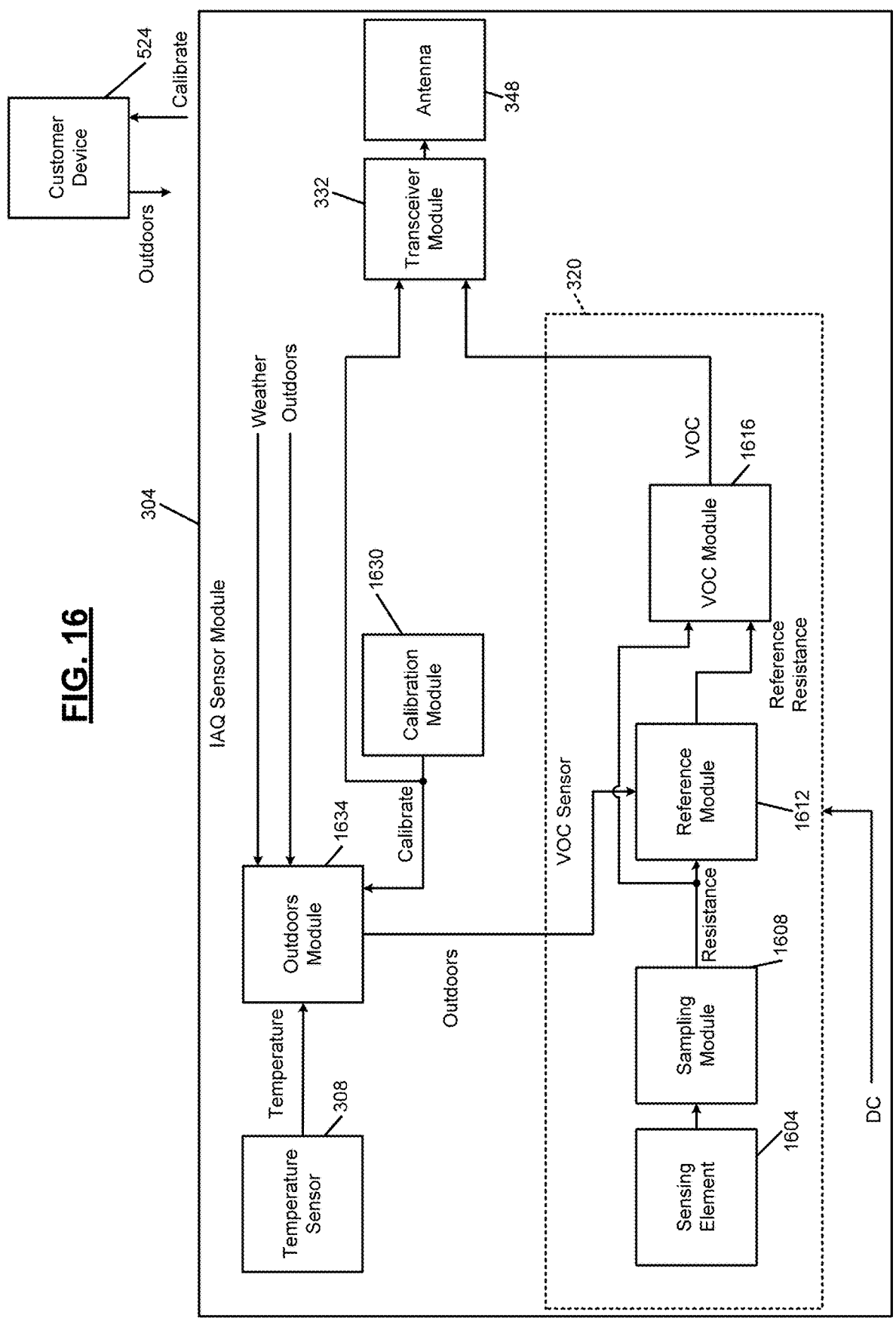
FIG. 16 includes a functional block diagram of an example portion of an IAQ sensor module.

FIG. 16 includes a functional block diagram of an example portion of the IAQ sensor module 304. As discussed above, the IAQ sensor module 304 may include the VOC sensor 320. The VOC sensor 320 includes a sensing element 1604 that varies its resistance as the amount of VOCs varies. For example, the resistance of the sensing element 1604 may decrease as the amount of VOCs increases and vice versa. The sensing element 1604 may be, for example, a metal oxide (MOX) sensing element or another suitable type of VOC sensing element. The relationship between amount of VOCs and sensing element resistance may be linear or non-linear.

A sampling module 1608 samples (analog) an output (e.g., resistance, current, or voltage) of the sensing element 1604 at a predetermined sampling rate to produce resistance samples corresponding to the present resistances of the sensing element 1608. The sampling module 1608 may also digitize the samples. The resistance may be measured or determined, for example, based on a voltage of the sensing element 1604 or current through the sensing element 1604.

A reference module 1612 selectively stores the resistance of the sensing element 1604 and outputs the stored resistance as a reference resistance. A VOC module 1616 determines the (present) amount of VOCs in the air based on the reference resistance and the (present) resistance of the sensing element 1604. The reference resistance may correspond to a predetermined minimum possible amount of VOCs (e.g., 175 ppb).

The VOC module 1616 determines the amount of VOCs using one of a lookup table and an equation that relates the resistance to the amount of VOCs given that the reference resistance corresponds to the predetermined minimum possible amount of VOCs. Generally speaking, the VOC module 1616 may set the amount of VOCs to the predetermined minimum possible amount of VOCs when the resistance is equal to the reference resistance. The VOC module 1616 may increase the amount of VOCs above the predetermined minimum possible amount of VOCs as a difference (or a magnitude of the difference) between the resistance and the reference resistance increases and vice versa.

As discussed above, the VOC sensor 320 uses the reference resistance of the sensing element 1604 to measure the amount of VOCs in the air. The reference resistance could be pre-calibrated, for example, by a manufacturer of the VOC sensor 320 or by the manufacturer of the IAQ sensor module 304. If the amount of VOCs in the air are relatively high during calibration of the reference resistance, however, the amount of VOCs measured by the VOC sensor 320 during use in the building may be higher or lower than the actual amount of VOCs in the air.

A calibration module 1630 selectively triggers updating of the reference resistance. The calibration module 1630 may trigger updating of the reference resistance, for example, every predetermined period (e.g., every 3 or 6 months), once during setup/installation of the IAQ sensor module 304, or when the drift offset of the VOC sensor 320 is greater than a predetermined value. The calibration module 1630 generates a calibrate signal to trigger updating of the reference resistance. The calibration module 1630 may transmit the calibrate signal to the customer device 524 to instruct the user to bring the IAQ sensor module 304 outdoors (i.e., outside of the building and all other buildings) into (clean) fresh air. As discussed above, this is possible due to the portability of the IAQ sensor module 304 (e.g., due to the IAQ sensor module 304 being powered by a battery).

In response to the calibrate signal, the customer device 524 may display a predetermine user interface on the display of the customer device 524 that instructs the user to leave the IAQ sensor module 304 outdoors into fresh air for at least a predetermined period (e.g., 10 minutes). In various implementations, the IAQ sensor module 304 may be provided with instructions to locate the IAQ sensor module 304 outdoors for at least the predetermined period when the IAQ sensor module 304 is first powered on.

In various implementations, the customer device 524 may transmit an outdoors signal to the IAQ sensor module 304 indicative of user input that the IAQ sensor module 304 is located outdoors. An outdoors module 1634 may increment a timer value in response to receipt of the outdoors signal. When the timer value is greater than the predetermined period, the outdoors module 1634 may trigger the reference module 1612 to update the reference resistance to the resistance at that time. In this manner, the outdoors module 1634 may trigger the reference module 1612 to update the reference resistance when the IAQ sensor module 304 has been located outdoors for at least the predetermined period.

In various implementations, the outdoors module 1634 may additionally or alternatively determine whether the IAQ sensor module 304 is located outdoors based on a comparison of the temperature measured by the temperature sensor 308 with an outdoor ambient temperature included in local data obtained from the one or more local data sources 532 using the geographical location of the building. For example, the outdoors module 1634 may increment the timer value when the temperature measured by the temperature sensor 308 is within a predetermined range (e.g., +/−5 degrees F.) of the outdoor ambient temperature of the local data. The outdoors module 1634 may reset the timer value when the temperature measured by the temperature sensor 308 is outside of the predetermined range of the outdoor ambient temperature of the local data. When the timer value is greater than the predetermined period, the outdoors module 1634 may trigger the reference module 1612 to update the reference resistance to the resistance at that time. In this manner, the outdoors module 1634 may trigger the reference module 1612 to update the reference resistance when the IAQ sensor module 304 has been located outdoors for at least the predetermined period.

While the example of the VOC sensor 320 is discussed in the example of FIG. 16, the same is true for the carbon dioxide sensor 324 and updating a reference resistance of a sensing element of the carbon dioxide sensor 324 to a predetermined minimum possible amount of carbon dioxide (e.g., 400 ppb).

Figure 17:
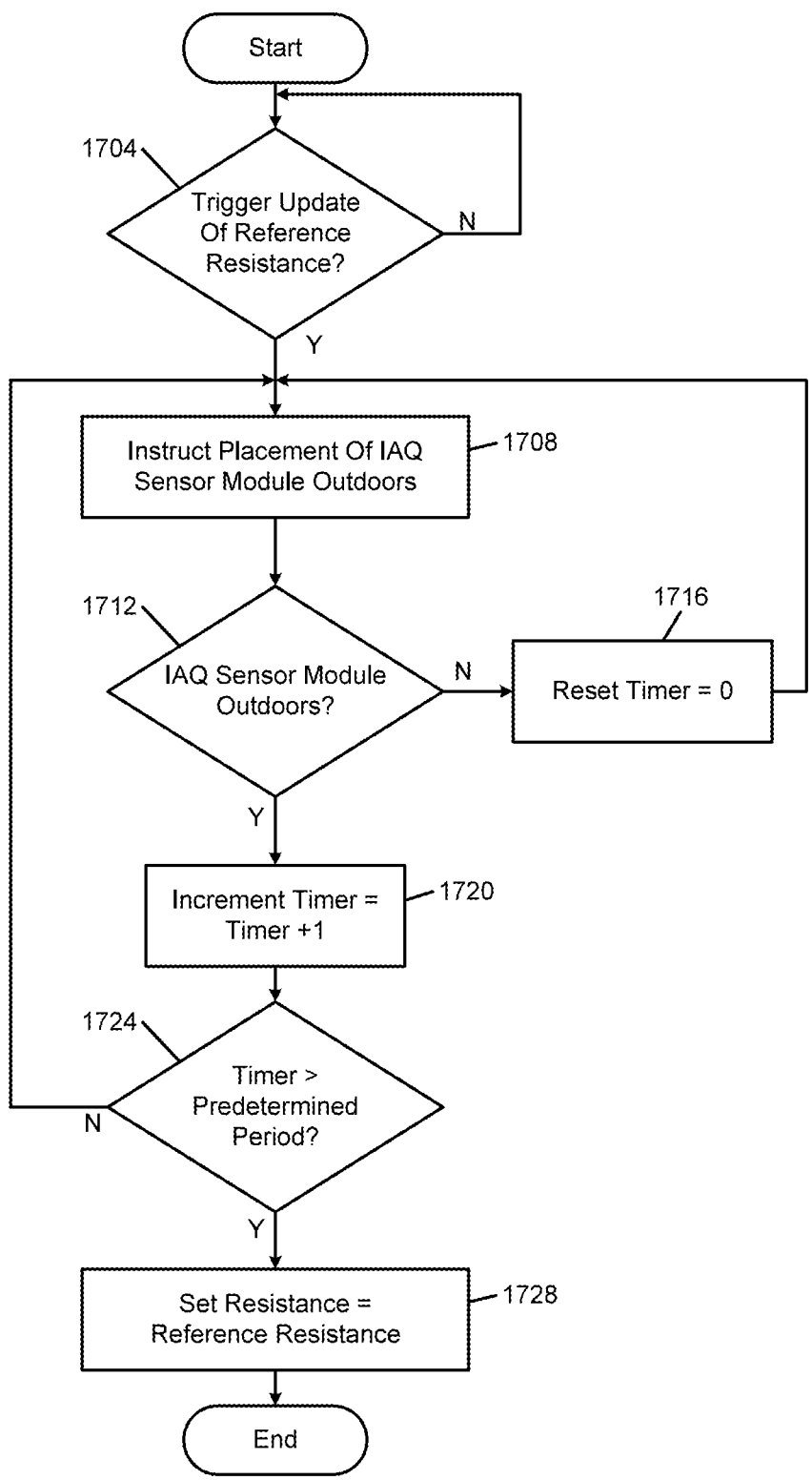
FIG. 17 includes a flowchart depicting an example method of calibrating a reference resistance of a sensing element of a VOC sensor.

FIG. 17 includes a flowchart depicting an example method of updating the reference resistance of the VOC sensor 320. Control may begin with 1704 where the calibration module 1630 determines whether to trigger an update (setting) of the reference resistance. The calibration module 1630 may determine to trigger an update of the reference resistance, for example, when the IAQ sensor module 304 is first powered on, during installation/setup of the IAQ sensor module 304, or when at least a predetermined period has passed since the reference resistance was last updated. If 1704 is true, control may continue with 1708. If 1704 is false, control may remain at 1704.

At 1708, the calibration module 1630 may transmit a signal to the customer device 524 to instruct the user to locate the IAQ sensor module 304 outdoors in fresh air. The customer device 524 may display the predetermined user interface instructing the user to locate the IAQ sensor module 304 outdoors in response to receipt of the signal.

At 1712, the outdoors module 1634 may determine whether the signal has been received from the customer device 524 indicative of user input that the IAQ sensor module 304 is located outdoors. Additionally or alternatively, the outdoors module 1634 may determine whether the temperature measured by the temperature sensor 308 is within the predetermined range of the outdoor ambient temperature provided based on the geographical location of the building. If 1712 is false, the outdoors module 1634 may reset a timer value to zero at 1716, and control may return to 1708. If 1712 is true, the outdoors module 1634 may increment the timer (e.g., set timer=timer+1) at 1720, and control may continue with 1724.

At 1724, the outdoors module 1634 may determine whether the value of the timer corresponds to a period greater than a predetermined period (e.g., approximately 10 minutes or another suitable period). If 1724 is true, the outdoors module 1634 triggers the reference module 1612, and control continues with 1728. If 1724 is false, control may return to 1708. At 1728, the reference module 1612 sets the reference resistance to the resistance of the sensing element 1604. In various implementations, the reference module 1612 may set the reference resistance to an average (weighted or non-weighted) of the last X resistance values of the sensing element 1604. X is an integer greater than or equal to 1 and may be, for example, 3, 5, or another suitable number.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An indoor air quality (IAQ) system for a building, comprising:
   an IAQ sensor module comprising a sensor configured to measure an amount of an item in air at the IAQ sensor module, wherein the item is one of particulate matter, volatile organic compounds (VOC), and carbon dioxide;
   a minimum module configured to selectively store the amount of the item as a minimum value of the amount in instances when a mitigation device has been on for at least a predetermined period,
   wherein the mitigation device is configured to decrease the amount of the item in the air when the mitigation device is on;

a storing module configured to selectively store the minimum value as an initial minimum value at a first instance of storing the amount as the minimum value;

an offset module configured to determine a drift offset for the sensor based on a difference between the minimum value and the initial minimum value; and an adjustment module configured to determine an adjusted amount of the item in the air at the IAQ sensor module based on the amount and the drift offset.

2. The IAQ system of claim 1 wherein the adjustment module is configured to:
set the adjusted amount of the item in the air based on the amount plus the drift offset.

3. The IAQ system of claim 1 wherein the offset module is configured to set the drift offset based on the initial minimum value minus the minimum value.

4. The IAQ system of claim 1 further comprising:
a transceiver configured to wirelessly transmit, via at least one antenna, the adjusted amount of the item in the air; and
a user device comprising a display, the user device being configured to display the adjusted amount of the item on the display.

5. The IAQ system of claim 1 wherein the minimum module is configured to selectively store the amount of the item as the minimum value of the amount in response to a determination that the mitigation device has been on for at least the predetermined period and the amount of the item is not decreasing.

6. The IAQ system of claim 1 wherein:
the IAQ sensor module further comprises a second sensor configured to measure a second amount of a second item in air at the IAQ sensor module, wherein the second item is one of particulate matter, VOC, and carbon dioxide that is different than the item;
the minimum module is further configured to selectively store the second amount of the second item as a second minimum value of the second amount when a second mitigation device has been on for at least a second predetermined period,
wherein the second mitigation device is configured to decrease the second amount of the second item in the air when the second mitigation device is on;
the storing module is further configured to selectively store the second minimum value as a second initial minimum value;
the offset module is further configured to determine a second drift offset for the second sensor based on a second difference between the second minimum value and the second initial minimum value; and
the adjustment module is further configured to determine a second adjusted amount of the second item in the air at the IAQ sensor module based on the second amount and the second drift offset.

7. The IAQ system of claim 1 wherein:
the IAQ sensor module further comprises a second sensor configured to measure a second amount of a second item in air at the IAQ sensor module, wherein the second item is one of particulate matter, VOC, and carbon dioxide that is different than the item;
the minimum module is further configured to selectively store the second amount of the second item as a second minimum value of the second amount when the mitigation device has been on for at least a second predetermined period,
wherein the mitigation device is further configured to decrease the second amount of the second item in the air when the mitigation device is on;
the storing module is further configured to selectively store the second minimum value as a second initial minimum value;
the offset module is further configured to determine a second drift offset for the second sensor based on a second difference between the second minimum value and the second initial minimum value; and
the adjustment module is further configured to determine a second adjusted amount of the second item in the air at the IAQ sensor module based on the second amount and the second drift offset.

8. The IAQ system of claim 1 wherein:
the IAQ sensor module further comprises:
a second sensor configured to measure a second amount of a second item in air at the IAQ sensor module, wherein the second item is one of particulate matter, VOC, and carbon dioxide that is different than the item; and
a third sensor configured to measure a third amount of a third item in air at the IAQ sensor module, wherein the third item is one of particulate matter, VOC, and carbon dioxide that is different than the item and the second item;
the minimum module is further configured to:
selectively store the second amount of the second item as a second minimum value of the second amount when a second mitigation device has been on for at least a second predetermined period,
wherein the second mitigation device is configured to decrease the second amount of the second item in the air when the second mitigation device is on; and
selectively store the third amount of the third item as a third minimum value of the third amount when a third mitigation device has been on for at least a third predetermined period,
wherein the third mitigation device is configured to decrease the third amount of the third item in the air when the third mitigation device is on;
the storing module is further configured to:
selectively store the second minimum value as a second initial minimum value; and
selectively store the third minimum value as a third initial minimum value;
the offset module is further configured to:
determine a second drift offset for the second sensor based on a second difference between the second minimum value and the second initial minimum value; and
determine a third drift offset for the third sensor based on a third difference between the third minimum value and the third initial minimum value; and
the adjustment module is further configured to:
determine a second adjusted amount of the second item in the air at the IAQ sensor module based on the second amount and the second drift offset; and
determine a third adjusted amount of the third item in the air at the IAQ sensor module based on the third amount and the third drift offset.

9. The IAQ system of claim 8 wherein:
the sensor includes a particulate sensor configured to measure an amount of particulate of at least a predetermined size present in the air;

the second sensor includes a volatile organic compound (VOC) sensor configured to measure an amount of VOCs present in the air; and the third sensor includes a carbon dioxide sensor configured to measure an amount of carbon dioxide present in the air.

10. The IAQ system of claim 1 further comprising:

an alert module configured to generate an alert signal when the drift offset is greater than a predetermined value; and a user device comprising a display, the user device being configured to display a predetermined user interface on the display in response to receipt of the alert signal.

11. An indoor air quality (IAQ) method, comprising:

by a sensor of an IAQ sensor module, measuring an amount of an item in air at the IAQ sensor module, wherein the item is one of particulate matter, volatile organic compounds (VOC), and carbon dioxide;

selectively storing the amount of the item as a minimum value of the amount in instances when a mitigation device has been on for at least a predetermined period, wherein the mitigation device is configured to decrease the amount of the item in the air when the mitigation device is on;

selectively storing the minimum value as an initial minimum value at a first instance of storing the amount as the minimum value;

determining a drift offset for the sensor based on a difference between the minimum value and the initial minimum value; and determining an adjusted amount of the item in the air at the IAQ sensor module based on the amount and the drift offset.

12. The IAQ method of claim 11 wherein determining the adjusted amount includes setting the adjusted amount of the item in the air based on the amount plus the drift offset.

13. The IAQ method of claim 11 wherein determining the drift offset includes setting the drift offset based on the initial minimum value minus the minimum value.

14. The IAQ method of claim 11 further comprising:

by a transceiver via at least one antenna, wirelessly transmitting the adjusted amount of the item in the air; and by a user device comprising a display, displaying the adjusted amount of the item on the display.

15. The IAQ method of claim 11 wherein selectively storing the amount of the item as the minimum value includes selectively storing the amount of the item as the minimum value of the amount in response to a determination that the mitigation device has been on for at least the predetermined period and the amount of the item is not decreasing.

16. The IAQ method of claim 11 further comprising:

by a second sensor of the IAQ sensor module, measuring a second amount of a second item in air at the IAQ sensor module, wherein the second item is one of particulate matter, VOC, and carbon dioxide that is different than the item;

selectively storing the second amount of the second item as a second minimum value of the second amount when a second mitigation device has been on for at least a second predetermined period, wherein the second mitigation device is configured to decrease the second amount of the second item in the air when the second mitigation device is on;

selectively storing the second minimum value as a second initial minimum value;

determining a second drift offset for the second sensor based on a second difference between the second minimum value and the second initial minimum value; and determining a second adjusted amount of the second item in the air at the IAQ sensor module based on the second amount and the second drift offset.

17. The IAQ method of claim 11 further comprising:

by a second sensor of the IAQ sensor module, measuring a second amount of a second item in air at the IAQ sensor module, wherein the second item is one of particulate matter, VOC, and carbon dioxide that is different than the item;

selectively storing the second amount of the second item as a second minimum value of the second amount when the mitigation device has been on for at least a second predetermined period, wherein the mitigation device is further configured to decrease the second amount of the second item in the air when the mitigation device is on;

selectively storing the second minimum value as a second initial minimum value;

determining a second drift offset for the second sensor based on a second difference between the second minimum value and the second initial minimum value; and determining a second adjusted amount of the second item in the air at the IAQ sensor module based on the second amount and the second drift offset.

18. The IAQ method of claim 11 further comprising:

by a second sensor of the IAQ sensor module, measuring a second amount of a second item in air at the IAQ sensor module, wherein the second item is one of particulate matter, VOC, and CO2 that is different than the item;

by a third sensor of the IAQ sensor module, measuring a third amount of a third item in air at the IAQ sensor module, wherein the third item is one of particulate matter, VOC, and carbon dioxide that is different than the item and the second item;

selectively storing the second amount of the second item as a second minimum value of the second amount when a second mitigation device has been on for at least a second predetermined period, wherein the second mitigation device is configured to decrease the second amount of the second item in the air when the second mitigation device is on;

selectively storing the third amount of the third item as a third minimum value of the third amount when a third mitigation device has been on for at least a third predetermined period, wherein the third mitigation device is configured to decrease the third amount of the third item in the air when the third mitigation device is on;

selectively storing the second minimum value as a second initial minimum value;

selectively storing the third minimum value as a third initial minimum value;

determining a second drift offset for the second sensor based on a second difference between the second minimum value and the second initial minimum value;

determining a third drift offset for the third sensor based on a third difference between the third minimum value and the third initial minimum value;

determining a second adjusted amount of the second item in the air at the IAQ sensor module based on the second amount and the second drift offset; and determining a third adjusted amount of the third item in the air at the IAQ sensor module based on the third amount and the third drift offset.

19. The IAQ method of claim 18 wherein:

the sensor includes a particulate sensor configured to measure an amount of particulate of at least a predetermined size present in the air;

the second sensor includes a volatile organic compound (VOC) sensor configured to measure an amount of VOCs present in the air; and the third sensor includes a carbon dioxide sensor configured to measure an amount of carbon dioxide present in the air.

20. The IAQ method of claim 11 further comprising:

generating an alert signal when the drift offset is greater than a predetermined value; and by a user device comprising a display, displaying a predetermined user interface on the display in response to receipt of the alert signal.

\* \* \* \* \*